(12) United States Patent
Tanskanen et al.

(10) Patent No.: US 7,451,401 B2
(45) Date of Patent: Nov. 11, 2008

(54) REAL-TIME, INTERACTIVE AND PERSONALIZED VIDEO SERVICES

(75) Inventors: Erkki Tanskanen, Vantaa (FI); Tapio Hameen-Anttila, Helsinki (FI); Juuso Vuorenoja, Helsinki (FI); Toni Kopra, Ojakkala (FI)

(73) Assignee: Nokia Corporation (FI)

( * ) Notice: Subject to any disclaimer, the term of this patent is extended or adjusted under 35 U.S.C. 154(b) by 828 days.

(21) Appl. No.: 09/981,688

(22) Filed: Oct. 17, 2001

(65) Prior Publication Data

US 2002/0054088 A1 May 9, 2002

Related U.S. Application Data

(63) Continuation of application No. PCT/US00/14694, filed on May 30, 2000.

(60) Provisional application No. 60/136,589, filed on May 28, 1999.

(51) Int. Cl.
G06F 3/00 (2006.01)
G06F 3/14 (2006.01)
G06F 17/60 (2006.01)

(52) U.S. Cl. .................. 715/744; 715/733; 715/747; 705/37; 707/10; 709/217; 463/25

(58) Field of Classification Search .............. 715/733, 715/738, 744, 747, 764, 765, 846, 866; 463/25, 463/31, 40, 42, 43; 705/37, 500; 707/1, 707/2, 3, 10; 709/203, 204, 217, 219, 220
See application file for complete search history.

(56) References Cited

U.S. PATENT DOCUMENTS 5,396,546 A 3/1995 Remillard .............. 379/96

(Continued)

FOREIGN PATENT DOCUMENTS

DE 100 65 211 A1 5/2002

(Continued)

OTHER PUBLICATIONS

"WAP—The Wireless Application Protocol" Ericsson Review, SE, Ericsson,.Stockholm, No. 4, 1998, pp. 150-153, XP000792053 ISSN: 0014-0171.

(Continued)

Primary Examiner—X. L Bautista
(74) Attorney, Agent, or Firm—Banner & Witcoff, Ltd.

(57) ABSTRACT

A method and system for providing a user interface to real time interactive video services. The method and system allow interactive input from a viewer of the video services simultaneously with viewing the video services. The method and system also allows an interactive response to the viewer from the interactive application. To present betting information in an attractive format and maximize the information available to the bettor, a user interface to the real-time service is required. With regard to real-time betting, the bettor is presented information concerning the betting opportunities and the betting window. Since most bettors prefer to have as much information as possible prior to betting, they prefer to wait until the last possible moment to bet. The disclosed embodiments provide the bettor with betting window information and the latest information concerning the prospective wagers. Moreover, the user interface is designed to provide such information in a manner that both attracts the attention of the bettor and provides the information in a useful, easy to follow and navigate format. The betting server checks the data transmission speed so that all users can have an adequate betting window. Users will receive confirmation of attempted bets. In WAP equipped mobile stations, betting can be accomplished across a wireless Internet connection. For example, bettors using GSM mobile stations can receive information by short message services through GSM SC.

25 Claims, 18 Drawing Sheets

U.S. PATENT DOCUMENTS

| | | | | |
|---|---|---|---|---|
| 5,437,036 | A | 7/1995 | Stamps et al. | |
| 5,539,822 | A | 7/1996 | Lett | 380/20 |
| 5,609,525 | A | 3/1997 | Ohno et al. | 463/43 |
| 5,643,088 | A * | 7/1997 | Vaughn et al. | 463/40 |
| 5,680,535 | A | 10/1997 | Harbin et al. | |
| 5,697,844 | A * | 12/1997 | Von Kohorn | 463/40 |
| 5,738,527 | A | 4/1998 | Lundberg | |
| 5,738,583 | A | 4/1998 | Comas et al. | 463/40 |
| 5,761,647 | A * | 6/1998 | Boushy | 705/10 |
| 5,762,552 | A * | 6/1998 | Vuong et al. | 463/25 |
| 5,764,913 | A * | 6/1998 | Jancke et al. | 709/224 |
| 5,770,533 | A * | 6/1998 | Franchi | 463/42 |
| 5,774,664 | A | 6/1998 | Hidary et al. | 395/200.48 |
| 5,775,993 | A * | 7/1998 | Fentz et al. | 463/17 |
| 5,778,181 | A | 7/1998 | Hidary et al. | 395/200.48 |
| 5,788,574 | A * | 8/1998 | Ornstein et al. | 463/25 |
| 5,793,415 | A * | 8/1998 | Gregory et al. | 348/14.1 |
| 5,796,967 | A * | 8/1998 | Filepp et al. | 715/764 |
| 5,798,759 | A * | 8/1998 | Dahl | 715/745 |
| 5,800,268 | A * | 9/1998 | Molnick | 463/40 |
| 5,806,849 | A | 9/1998 | Rutkowski | 273/438 |
| 5,819,284 | A | 10/1998 | Farber et al. | |
| 5,830,067 | A * | 11/1998 | Graves et al. | 463/40 |
| 5,830,068 | A * | 11/1998 | Brenner et al. | 463/42 |
| 5,836,817 | A * | 11/1998 | Acres et al. | 463/26 |
| 5,848,396 | A | 12/1998 | Gerace | 705/10 |
| 5,848,936 | A * | 12/1998 | Morrison | 463/17 |
| 5,850,220 | A | 12/1998 | Motai | |
| 5,852,436 | A | 12/1998 | Franklin et al. | |
| 5,855,008 | A * | 12/1998 | Goldhaber et al. | 705/14 |
| 5,855,515 | A | 1/1999 | Pease et al. | 463/27 |
| 5,861,881 | A * | 1/1999 | Freeman et al. | 715/500.1 |
| 5,862,324 | A | 1/1999 | Collins | 395/200.5 |
| 5,870,683 | A | 2/1999 | Wells et al. | |
| 5,877,755 | A | 3/1999 | Hellhake | 345/327 |
| 5,881,299 | A | 3/1999 | Nomura et al. | |
| 5,886,689 | A | 3/1999 | Chee et al. | |
| 5,971,271 | A * | 10/1999 | Wynn et al. | 235/380 |
| 5,980,264 | A | 11/1999 | Lundberg | |
| 5,999,808 | A * | 12/1999 | LaDue | 455/412.2 |
| 6,024,641 | A * | 2/2000 | Sarno | 463/17 |
| 6,043,837 | A * | 3/2000 | Driscoll et al. | 348/36 |
| 6,044,376 | A * | 3/2000 | Kurtzman, II | 707/102 |
| 6,058,379 | A * | 5/2000 | Odom et al. | 705/37 |
| 6,080,062 | A * | 6/2000 | Olson | 463/42 |
| 6,084,583 | A | 7/2000 | Gerszberg et al. | |
| 6,108,711 | A * | 8/2000 | Beck et al. | 709/242 |
| 6,110,041 | A | 8/2000 | Walker et al. | 463/20 |
| 6,117,013 | A * | 9/2000 | Eiba | 463/41 |
| 6,145,083 | A | 11/2000 | Shaffer et al. | |
| 6,186,892 | B1 * | 2/2001 | Frank et al. | 463/19 |
| 6,222,520 | B1 * | 4/2001 | Gerszberg et al. | 715/784 |
| 6,256,008 | B1 | 7/2001 | Sparks et al. | |
| 6,288,715 | B1 | 9/2001 | Bain et al. | |
| 6,317,795 | B1 * | 11/2001 | Malkin et al. | 709/246 |
| 6,400,810 | B1 | 6/2002 | Skladman et al. | |
| 6,449,601 | B1 * | 9/2002 | Friedland et al. | 705/37 |
| 6,466,783 | B2 * | 10/2002 | Dahm et al. | 455/414.2 |
| 6,507,351 | B1 | 1/2003 | Bixler | |
| 6,516,421 | B1 | 2/2003 | Peters | |
| 6,564,263 | B1 * | 5/2003 | Bergman et al. | 709/231 |
| 6,589,291 | B1 * | 7/2003 | Boag et al. | 715/513 |
| 6,666,769 | B2 * | 12/2003 | Stronach | 463/40 |
| 6,694,482 | B1 * | 2/2004 | Arellano et al. | 715/500.1 |
| 6,712,702 | B2 * | 3/2004 | Goldberg et al. | 463/42 |
| 6,731,314 | B1 * | 5/2004 | Cheng et al. | 715/848 |
| 2002/0033844 | A1 | 3/2002 | Levy et al. | 345/744 |
| 2002/0049833 | A1* | 4/2002 | Kikinis | 709/219 |
| 2002/0055992 | A1 | 5/2002 | King et al. | |
| 2002/0196294 | A1 | 12/2002 | Sesek | |
| 2003/0169306 | A1 | 9/2003 | Makipaa et al. | |
| 2003/0203731 | A1 | 10/2003 | King et al. | |
| 2004/0024610 | A1* | 2/2004 | Fradkov et al. | 705/1 |
| 2004/0075701 | A1 | 4/2004 | Ng | |
| 2005/0026694 | A1* | 2/2005 | Kelly et al. | 463/42 |
| 2005/0080882 | A1* | 4/2005 | Philyaw et al. | 709/220 |
| 2006/0093142 | A1* | 5/2006 | Schneier et al. | 380/251 |

FOREIGN PATENT DOCUMENTS

| | | |
|---|---|---|
| EP | 000552822 A2 * | 7/1993 |
| EP | 0 733 983 A2 | 9/1996 |
| EP | 0776132 | 5/1997 |
| EP | 0804012 | 10/1997 |
| EP | 0873772 | 10/1998 |
| EP | 0 917 071 A2 | 5/1999 |
| GB | 2330503 | 4/1999 |
| GB | 2 339 374 A | 1/2000 |
| JP | 408194753 A * | 7/1996 |
| JP | 09-097029 | 4/1997 |
| JP | 11-066001 | 3/1999 |
| JP | 11-110401 | 4/1999 |
| JP | 2000-009480 | 1/2000 |
| WO | 9323125 | 11/1993 |
| WO | 9613119 | 5/1996 |
| WO | WO9710558 | 3/1997 |
| WO | 9847589 | 10/1998 |
| WO | 9909744 | 2/1999 |
| WO | WO99/35778 | 7/1999 |
| WO | WO9965256 | 12/1999 |
| WO | WO 0059167 | 10/2000 |
| WO | WO 00/73916 | 12/2000 |

OTHER PUBLICATIONS

Digital Video Broadcasting (DVB); Framing structure, channel coding and modulation for digital terrestrial television; European Standard (Telecommunication series); EN 300 744, V1.1.2 (Aug. 1997).
Business News; Nokia Delivers Its Millionth D-Box; Mar. 31, 1999; pp. 1-2.
Bickmore, et al., "Web Page Filtering and Re-Authoring for Mobile Users", Computer Journal, vol. 42, No. 6, 1999, pp. 534-546.
K. Ham et al., "Wireless Adaptation of WWW Content Over CDMA", IEEE International Workshop on Mobile Multimedia Communications (MOMUC '99), San Diego, CA, US, Nov. 15-17, 1999, pp. 368-372.
Hori, et al., "Annotation based Web Content Transcoding," Computer Networks, vol. 3, No. 1-6, Jun. 2000, pp. 197-211.
Sodergard et al., "Integrated Multimedia Publishing: Combining TV and Newspaper Content On Personal Channels", The Eighth International World Wide Web Conference, pp. 33-50, May 11-14, 1999.
*SETI@home* The Search for Extraterrestrial Intelligence, printed Mar. 12, 2003, http://setiahome.ssl.Berkeley.edu.
Screen Saver for Nokia 7650 and 3650, printed Mar. 11, 2003, http://www.psiloc.com/nokia/eng/ssaver/7650/index.html.
"Ex-Symbian exec launches mobile software biz", The register, printed Mar. 11, 2003, http://www.theregister.co.uk/content/39/25417.html.
Screen Saver for Nokia 7650 and 3650, Mar. 11, 2003.
"Drempels", Ryan M. Geiss. Apr. 5, 2001 http://web.archive.org/web/20010411030126/http://www.geisswerks.com/drempels/.
"Serandom Screensaver Manager" Seraline P/L. 2000 http://web.archive.org/web/20001202004800/http://www.seraline.com/serandom.htm.
How to write a 32bit screen saver. Lucian Wischik. http://www.wischik.com/scr/howtoscr.html. Last updated Jul. 2000. 28 pages.
How to use Microsoft Windows NT 4 Workstation. Gavron and Moran. Ziff-Davis press. Emeryville, CA 1996: pp. 130-131.

* cited by examiner

FIG. 7C

| Date | Time | No. | Game | Odds | | | |
|---|---|---|---|---|---|---|---|
| TUESDAY 29.02. | at 16.45 | 01 | Slavia Praha - Udinese | 2,15 | 2,60 | 2,50 | |
| | at 18.45 | 02 | Parma - Werder Bremen | 1,55 | 2,70 | 2,80 | UEFA |
| | at 19.30 | 03 | Kiovan Dynamo - Rosenborg | 1,40 | 2,90 | 2,50 | UEFA |

FIG. 7D

| Date | Time | No. | Game | result | 45 min | 0 min |
|---|---|---|---|---|---|---|
| TUESDAY 29.02. | at 16.45 | 01 | Slavia Praha - Udinese | 2 - 0 | | |
| | at 18.45 | 02 | Parma - Werder Bremen | | 0 - 1 | |
| | at 19.30 | 03 | Kiovan Dynamo - Rosenborg | | | 0 - 0 |

| | | | |
|---|---|---|---|
| GREEN | PLENTY OF TIME | YES | DAYS |
| ORANGE | DAY OR TWO | YES | DAY |
| RED | A COUPLE MINUTES | NO | MINUTES |

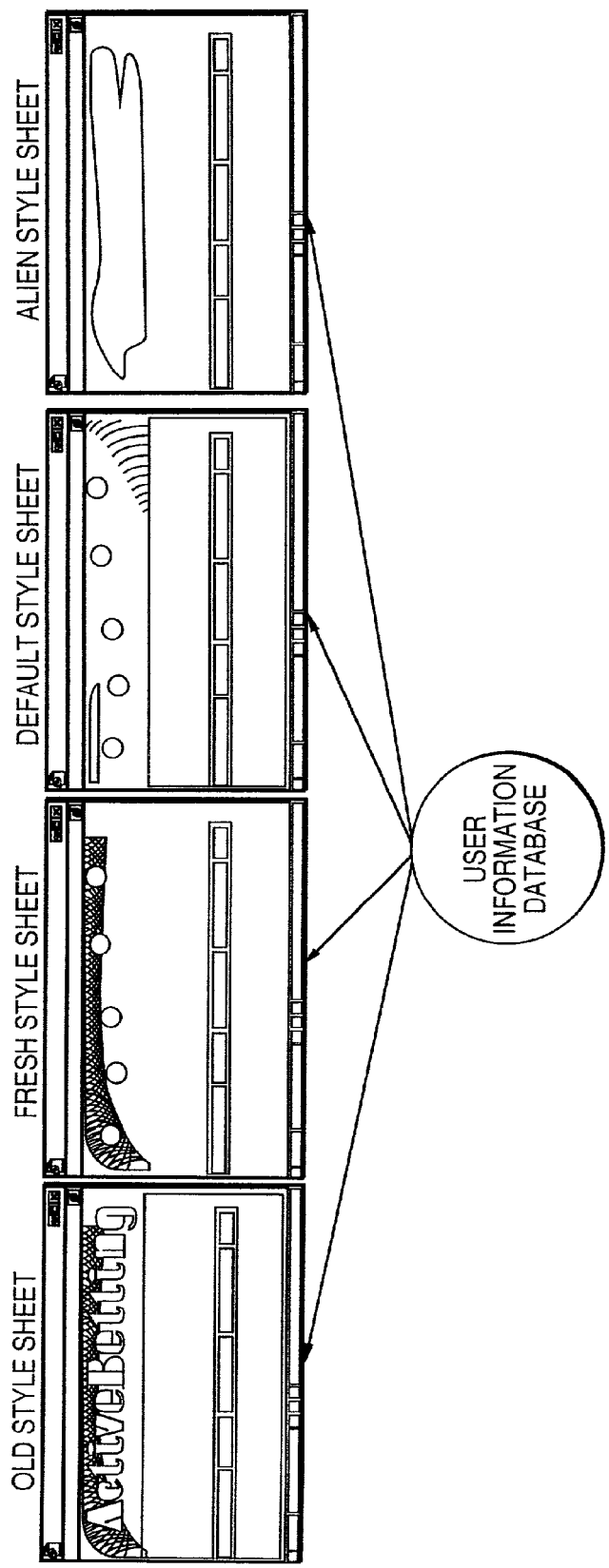

REAL-TIME, INTERACTIVE AND PERSONALIZED VIDEO SERVICES

This application is a continuation of International Application No. PCT/US00/14694, filed on May 30, 2000, and also claims priority of U.S. Provisional Application No. 60/136,589 filed on May 28, 1999.

TECHNICAL FIELD

This invention relates to communication services. Particular aspects of the invention relate to providing a user interface for real time, interactive video services and to providing personalized betting services.

BACKGROUND ART

During the last few decades, same-time-same-place gambling has been complemented by same-time-different-place activities. Telephone betting has a long history that includes activities that have been proscribed (e.g., starting price or S.P. bookies), that have been approved (e.g., on-course bookies), and, in some countries, that have been State-conducted (e.g., phone-betting with State Government Totalizator Agency Boards or TABs).

It has long since been recognized that the virtualization of gambling could result in major changes to society. Whereas in 1975 few people might have contemplated a future in which bets could be placed on which member of the British Royal Family would die next, or on which state would next erupt in civil war, such bets can now be placed in the United Kingdom and in several other nations around the world. Betting houses offering such services are becoming readily accessible on the Internet. (See, for example, www.casinos-gambling.com/os-books.htm.) Additionally, interactive networks are emerging from several hitherto separate technologies, for example, cable transmission, growing out of cable-TV, where the capacity of the connection is typically split between high-bandwidth down-channels and low-bandwidth up-channels. The Internet, with connection to the home and most workplaces via a conventional public switched telephone network (PSTN) can also be used.

Gambling is increasingly becoming a major feature of interactive networks. So much so, it appears to be one of the largest sources of revenue generation on the Internet. Use of the Internet for gambling is especially significant because it is fully operational, it uses an existing and pervasive infrastructure, and its market reach is already very wide. In addition to its physical advantages the growth rate of the Internet is dramatic and it is intrinsically extra-, and even supra-jurisdictional, making it extremely resistant to existing regulatory frameworks.

Satellite and cable infrastructures may be used to operate services independent from the Internet. It is important to note, however, that they are also entirely capable of being used as carrier mechanisms for Internet traffic, and indeed to support both proprietary and Internet channels at the same time. If satellite and/or cable come to supplant the public switched telephone network (PSTN) carried Internet, it will not necessarily supplant the Internet itself.

Digital television provides more channels at a higher quality than is currently available with analog broadcasts. One analog channel provides the capacity for one high-definition television (HDTV) broadcast or several standard definition television (SDTV) broadcasts. Digital television is scalable between these two extremes. Therefore, digital broadcasters can make a trade-off between vastly improved image and sound quality and an increased number of programming choices.

Digital television is deliverable to moving receivers. Currently, analog television reception is non-existent or severally limited in moving receivers. However, digital receivers allow for clear reception in cars, buses, trains, and in handheld television sets such as the Sony Watchman™. With a Global System for Mobile Communication (GSM) mobile phone connected to a laptop and a DVB-T (terrestrial) receiver plug-in card, browsing the web at speeds of 2–14 Mb/s is possible.

Most of the equipment used to create, edit, and distribute television programs is now digital. The analog reception of a television signal, via cable, aerial, or satellite, is the end result of a long chain of events, most of which have taken place in the digital domain. For example, in delivering a new broadcast, the field reporter uses digital satellite news gathering equipment to uplink her report to a programming center. The material is digitally received, decoded, and compiled with live program feeds in a studio. The broadcast is then sent digitally around the world to professional receivers. Finally, the broadcast is converted to an analog signal and sent to the end viewer.

A typical television video circuit includes a tuner that receives the RF signals from an antenna or cable port. The tuner selects a particular frequency of the RF signal representing a viewing channel. The selected channel frequency from the tuner is processed through an IF amplifier and detector that amplifies the selected channel and reduces its frequency to a baseband video signal. A National Television Standards Committee (NTSC) decoder receives the baseband video signal from Intermediate Frequency (IF) amplifier and detector and separates the RGB signals according to the NTSC format. A microprocessor controls the tuner, IF amplifier, and NTSC decoder.

It is common in modern television receivers to provide functions such as picture-in-picture (PIP), enhanced audio, and other special features, as options. Current television receivers incorporate such modules on a hard-wired basis. The PIP feature requires a composite video signal from a source other than the television tuner. The signal from that external video source is displayed on a selected portion of the cathode ray tube (CRT) viewing screen along with the main video signal.

An intelligent TV is for receiving communication services by connecting a TV to a value added network (VAN). The intelligent TV includes an information signal processing unit for receiving information communication data (hereinafter, "information data") when the intelligent TV is connected to the VAN, and for generating information RGB signals, and switching control signals in order to display the information data on a screen. The intelligent TV selects and displays on the screen one of the information data signals processed in the information signal processing unit and a TV RGB signal processed in a TV signal processing unit, in accordance with the switching control signal output from the information signal processing unit. Intelligent TV makes it possible to view, through a TV screen, several communication services, such as stock quotes, news services, weather reports, and TV program lists, being transmitted through the VANs. Therefore, it has an advantage that persons who are not familiar with the usage of a computer can easily receive communication services. Even though intelligent TV has the advantage of receiving communication services through the TV screen, it cannot display multiple signals at the same time. Information signals for displaying information data on a screen, a TV signal, a Picture-In-Picture (PIP) signal for enabling two screens to be viewed simultaneously, and a TV on-screen-display (OSD) signal must be displayed one at a time. Therefore, signals are displayed according to a predetermined priority. For example, an information signal is displayed preferentially over a TV signal, a PIP signal is displayed preferentially over an information signal, and a TV OSD signal is displayed preferentially over a PIP signal.

Current information delivery services described above lack many features that would enhance their usability and desirability by the public. As mentioned, the intelligent TV lacks an ability to display multiple signals simultaneously. In addition, an online connection of two delivery services with one of the services being, for example, an interactive application, is not available. Current technologies are dependent on stationary receivers. Since multiple signals cannot be integrated by the IRD, information delivery is dependent on the location or site.

With particular regard to betting, real-time betting is quite difficult to carry out when the competition is on going in one location and the betting is done in several different remote places. Current systems do not show the possibility of betting once a competition begins since there is no connection to the betting environment. Existing systems do not offer the possibility of betting during television program reception on the basis of the second screen on the display. Further, bettors are not shown a table for inputting the betting values to be sent to the betting system in real-time. Therefore, current systems are not intuitive or easy to use by a majority of bettors.

Real-time, interactive services can present problems regarding timing and presentation of information. With particular regard to betting services, the user needs to be aware of the betting window available. A slow or non-responsive user interface can cause a bettor to miss the window and loose a betting opportunity. Different bettors may rely on different information or desire the information to be presented in a particular format. The format of the information may detract from the betting experience or impair the calculating abilities of some bettors. However, current systems provide a standardized format without being aware of, and responsive to, the respective preferences of different bettors.

SUMMARY OF THE INVENTION

The disclosed embodiments provide methods and systems for providing a user interface to real time interactive video services. The methods and systems allow interactive input from a viewer of the video services simultaneously with viewing the video services. They allow an interactive response to the viewer from the interactive application. To present betting information in an attractive format and maximize the information available to the bettor, a user interface to the real-time service is required. With regard to real-time betting, the bettor is presented information concerning the betting opportunities and the betting window. Since most bettors prefer to have as much information as possible prior to betting, they prefer to wait until the last possible moment to bet. The disclosed embodiments provide the bettor with betting window information and the latest information concerning the prospective wagers. Moreover, the user interface is designed to provide such information in a manner that both attracts the attention of the bettor and provides the information in a useful, easy to follow and navigate format. The betting server checks the data transmission speed so that all users can have an adequate betting window. Users will receive confirmation of attempted bets. In Wireless Application Protocol (WAP) equipped mobile stations, betting can be accomplished across a wireless Internet connection. For example, bettors using GSM mobile stations can receive information by short message services through a GSM Switching Center (GSM SC).

The disclosed embodiments can provide many advantages. For example, when betting is available, the bettor is informed by a visual or graphical presentation. The interface attracts the attention of the bettor in order to ensure that notification of an open betting window is received. For another example, the user can get a user interface (or "skin") which best displays the information needed, given the users preferences. The chosen skin can influence the title, shapes, background, colors and fonts etc. The betting window available is adjusted to fit the data transmission capabilities of the user. Phones with WAP, e.g., Nokia 7110 or Nokia Communicator 9110I, can provide the ability to interact with the real-time service over a wireless connection. This capability allows the user to, for example, bet on a hockey game while in the arena watching the game live.

The betting services can be personalized in any number of ways to provide an advanced betting system. For example, the system can collect information of each bettor's preferred betting subjects or sports teams and provide personalized betting services according to the preferences indicated by the collected betting information.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 7C and 7D illustrate examples of betting content retrieved by the betting provider architecture in the second sample embodiment.

FIG. 14 depicts skins which can be configured according to user preference.

BEST MODE FOR CARRYING OUT THE INVENTION

The numerous innovative teachings of the present application will be described with particular reference to preferred embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The preferred embodiments of the disclosed innovations involves the simultaneous reception and display of a DVB-T signal and display of dynamic or static content on a television. The static content is like that of a wireless terminal, e.g., a mobile phone, a media phone, or an electronic book.

Various embodiments of the disclosed method and system will be described using interactive betting as an example of interactive content supplied to an end viewer. However, it should be noted that interactive betting is just one of many services that can be provided with the disclosed embodiments.

Figure 1:
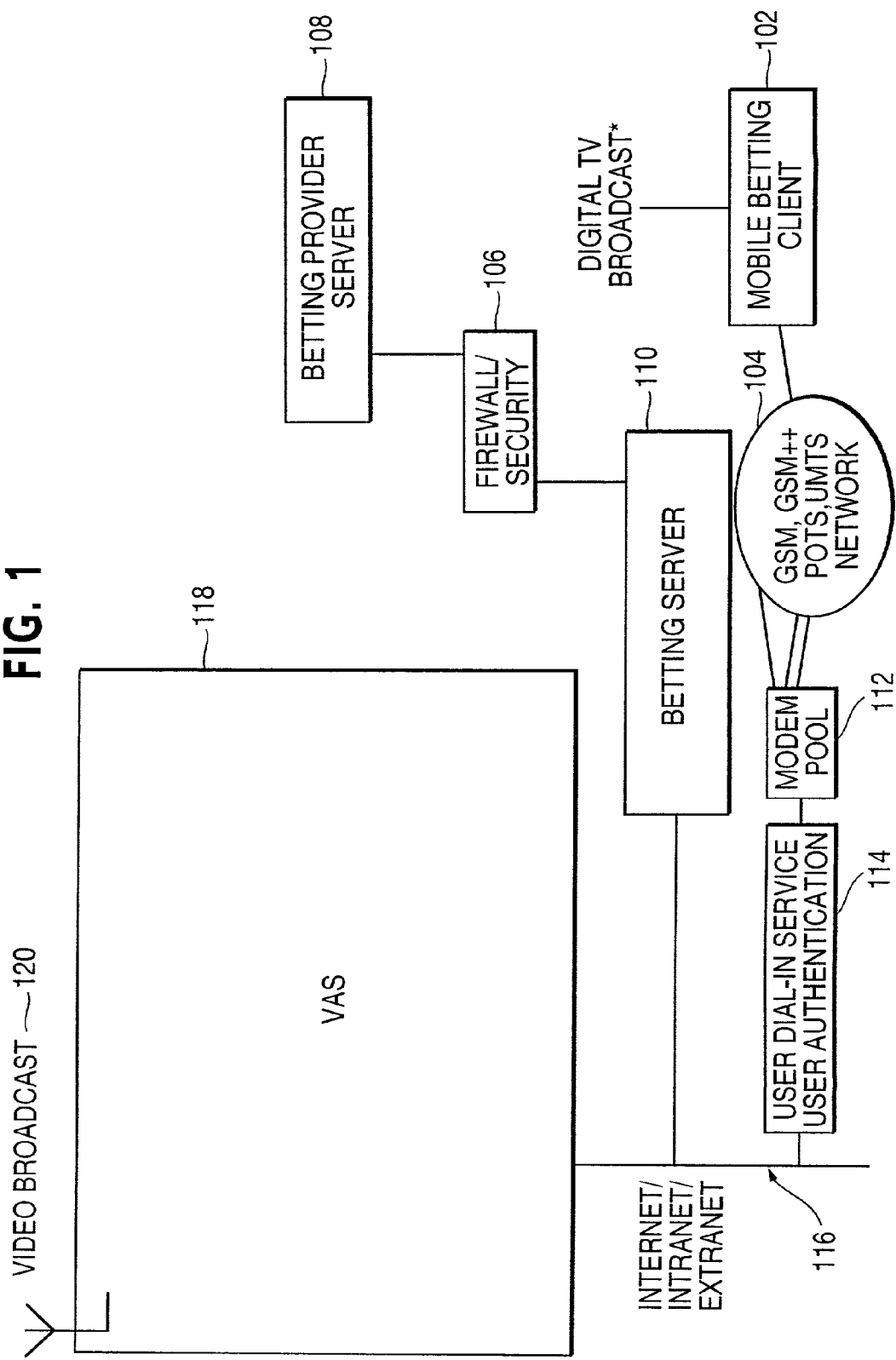
FIG. 1 depicts a block diagram of the creation, reception, and response to interactive services.

In the various disclosed embodiments, an interactive application, betting, for example, is facilitated. FIG. 1 depicts a block diagram of the creation, reception, and response to interactive services in the presently preferred embodiment. A television signal 120 is received, compressed, and converted for streaming onto the Internet 118. Betting information is also created or obtained and then streamed onto the Internet 108 and 110. A mobile betting client 102 can display the television program 120 and the betting information simultaneously and a viewer can interactively select betting via the mobile betting client 102. Finally, the mobile betting client 102 transmits information to the host facility 108 by connecting to a network 116 linked with the host facility 108, for example, the Internet.

Alternatively, a host facility 108 can integrate data to be supplied to the viewer into the vertical blanking intervals of the television signal 120 and broadcast (or stream) the integrated signal. A mobile betting client 102 receives the broadcast integrated signal and separates the integrated signal into a television signal and the supplied dynamic or static data.

Digital broadcast technology allows for services that can present many-to-one, many-to-many, and one-to-one communication. DVB has defined delivery media for satellite services (DVB-S, direct-to-home viewing, cable (DVB-C) run in several countries, and terrestrial, or "over the air", (DVB-T) planned for 17 countries. Use of return channels enables digital receivers to provide a variety of services including Internet, television, and web content. Processing of the digital signal can be accomplished on a desktop or laptop computer.

Figure 2:
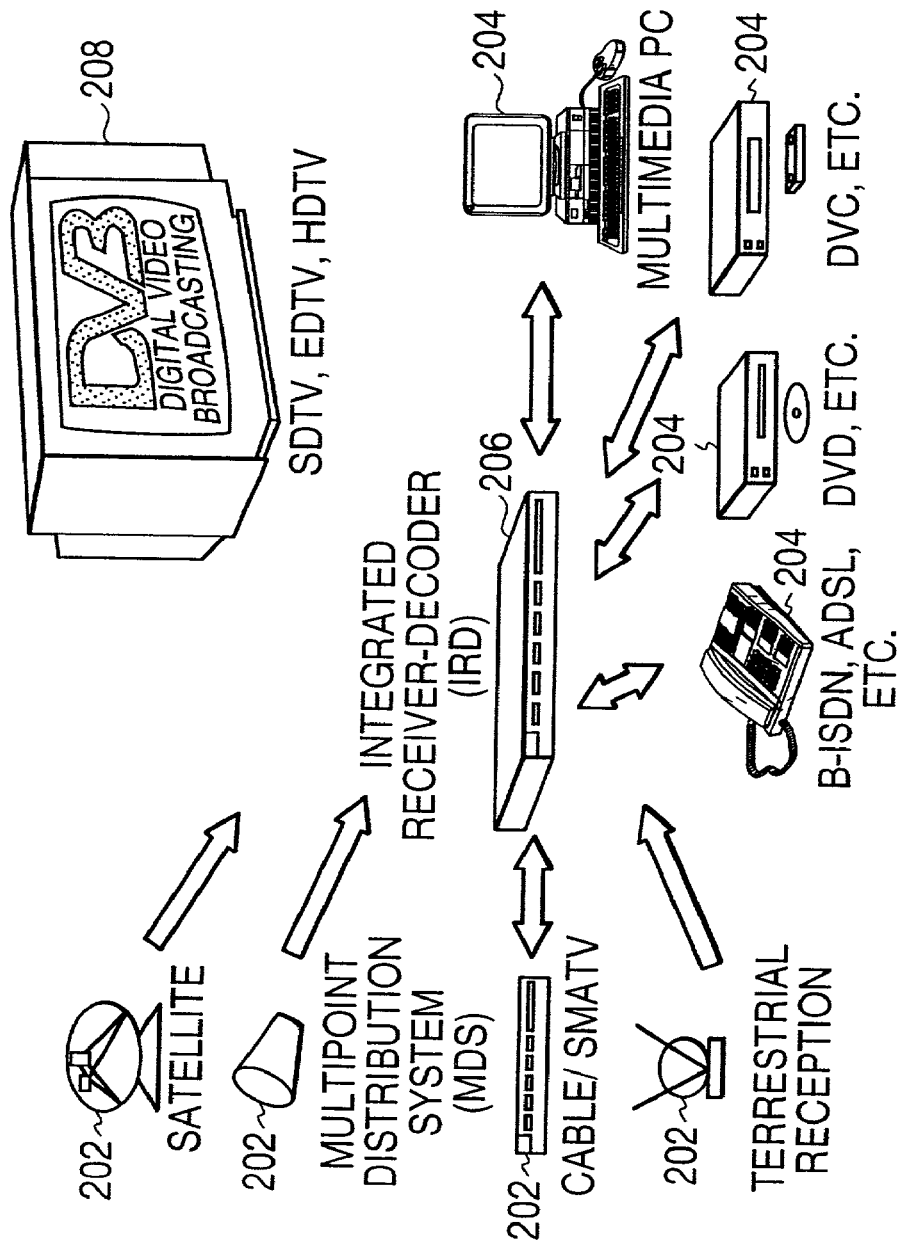
FIG. 2 depicts a block diagram of digital services being delivered to a viewer.

FIG. 2 depicts a block diagram of digital services being delivered to a viewer. The interfaces for the media can include, for example, GSM, GSM+, UMTS, ISDN, PSTN, ATM, and others 202. The protocol and interface enable a cluster of interconnected devices in the home, each receiving and processing digital broadcast services 204. A set top box (STB) or integrated receiver-decoder (IRD), such as the d-box™ manufactured by Nokia, Inc., 206 integrates the services for viewing on a television 208.

A television receiver that incorporates the invention should include a plug-in PIP module. Most receivers that incorporate PIP and other features also include a microprocessor control which, via a suitable control bus, periodically interrogates certain functional blocks and modules in the television receiver chassis to determine whether they are present and, if so, to control their operation. In the case of a PIP module, polling by the microprocessor indicates whether the module is present in the receiver. If it is, the microprocessor arranges to switch the composite video signals (from the tuner and external sources) through the PIP processor and then to the main video processor of the television receiver, in preference to the normal composite video produced. Thus, the video processor of the television receiver has its inputs supplied from either the main chassis in the event there is no PIP module or from the PIP processing module.

A viewer watches a mobile betting client 102, for example, a digital television, which is able to act as an Internet browser. Commercial applications such as Inet solution enable television/browser functionality. A dial-up connection or other communications device, such as a LAN connection, can provide Internet connectivity. Along with web browsing functions, the mobile betting client is equipped with streaming video and audio reception and display and secure connection capabilities.

Figure 4:
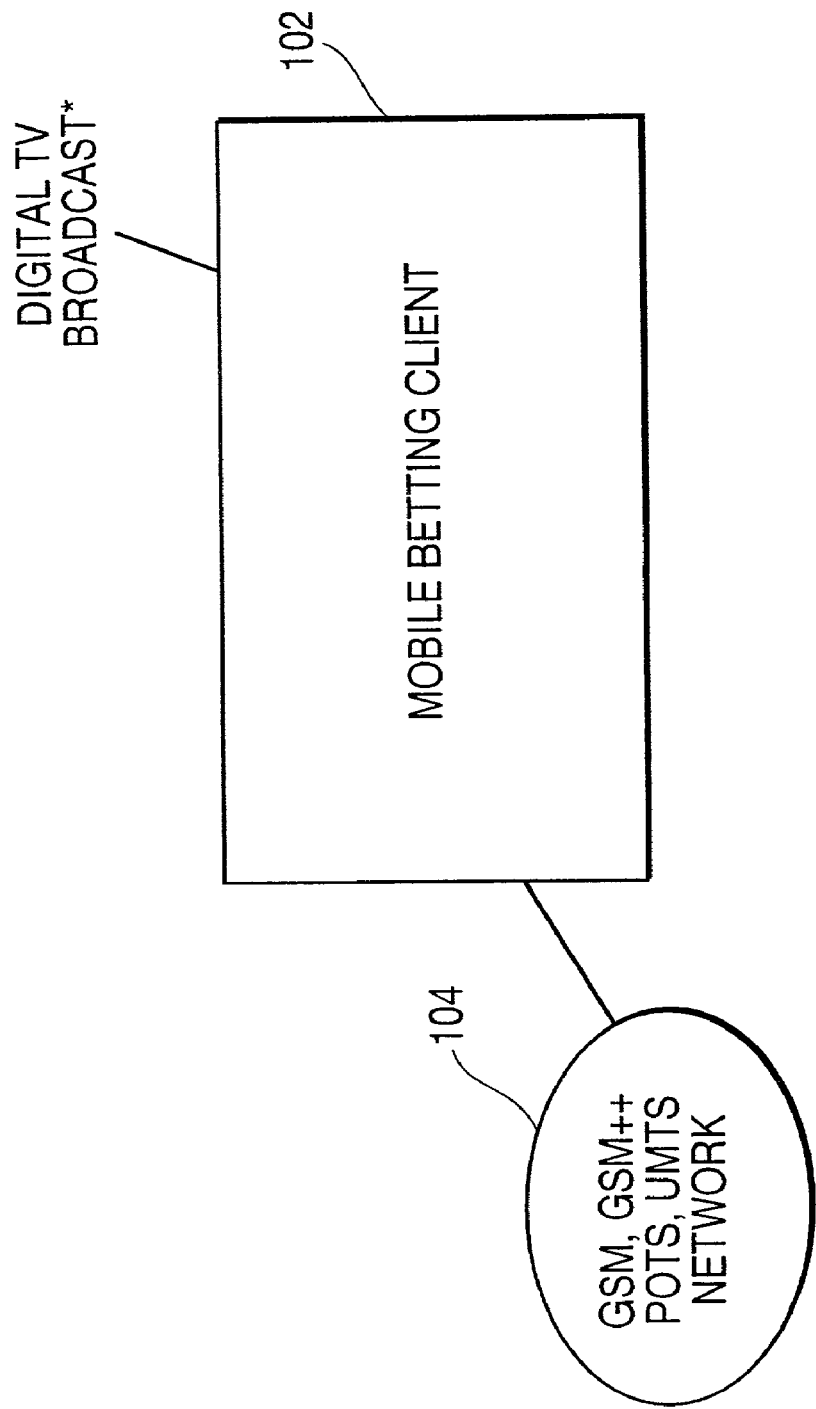
FIG. 4 depicts a block diagram of the viewer's connectivity and interaction with the provided interactive services.

FIG. 4 depicts a block diagram of the connectivity of the viewer and interaction with the provided interactive services. In the preferred embodiments, the mobile betting client 102 receives an integrated digital broadcast signal (DVB-T). Reception of the signal can be accomplished through various means. In the presently preferred embodiment, the mobile betting client receives the signal over a GSM, GSM++, POTS, UMTS, or other type of connection 104. The mobile connection 104 is itself connected to a network such as an extranet, intranet, or the Internet 116. Mobile connection to the network 116 takes place in a conventional manner over a modem pool 112 with user dial-in and authentication services 114.

Figure 7A:
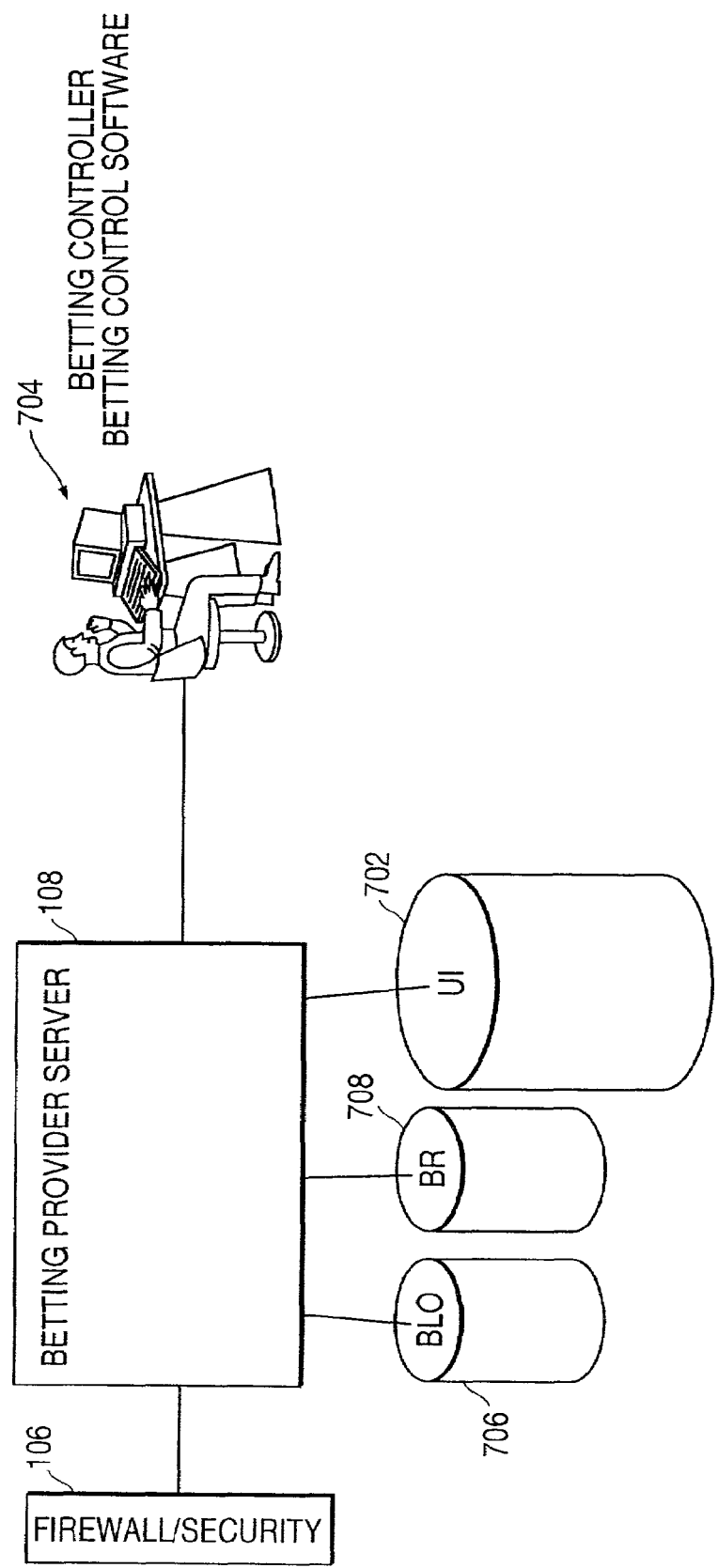
FIG. 7A depicts a block diagram of a first sample embodiment of the betting provider architecture.

FIG. 7A depicts a block diagram of the first sample embodiment of a betting provider architecture. In this preferred embodiment, the betting provider information is protected from network snooping by a security device such as a firewall 106. At least one betting provider server 108 resides behind the firewall. Software running on the server tracks viewers (bettors) in various competitions.

One task of the server 108 is to authenticate viewers. In the presently preferred embodiment, a user information (UI) database 702 is maintained. The UI database 702 stores user names and associated passwords, user account information, user preferences, and other user specific information. In addition to tracking viewers, the server 108 receives and accepts bets that have been requested by the viewer to a betting server 110 running on the network side of the firewall 106 and connected to a network such as an extranet, intranet, or the Internet 116. This betting server 110 acts as an interface between interactive services viewers on the network and the actual betting provider.

The betting provider server 108 receives betting content (questions to the user) and the odds of the particular bets from a betting controller 704. The betting controller 704 is responsible for creating betting content, controlling the betting event, i.e., opening and closing of betting, etc. Betting control software is used to enter and calculate betting content and odds and send them to the betting provider server 108. In the presently preferred embodiment, the betting provider server 108 stores the betting content and odds in a database (BCO) 706. The betting controller 704, via betting control software tracks, the results of the betting question and reports the results to the betting provider server 108.

The results of the bets are stored in a database (BR) 708. Once the results of a particular question are known and stored by the betting provider server 108, software on the server calculates payments to the bettors on the particular question. In the presently preferred embodiment, electronic accounts stored in the UI database 702 are used for tracking betting wins and losses. The results of the event and sub-events (betting questions) are reported to the betting server 110. The mobile betting client 102 can then receive the results from the betting server 110.

Figure 7B:
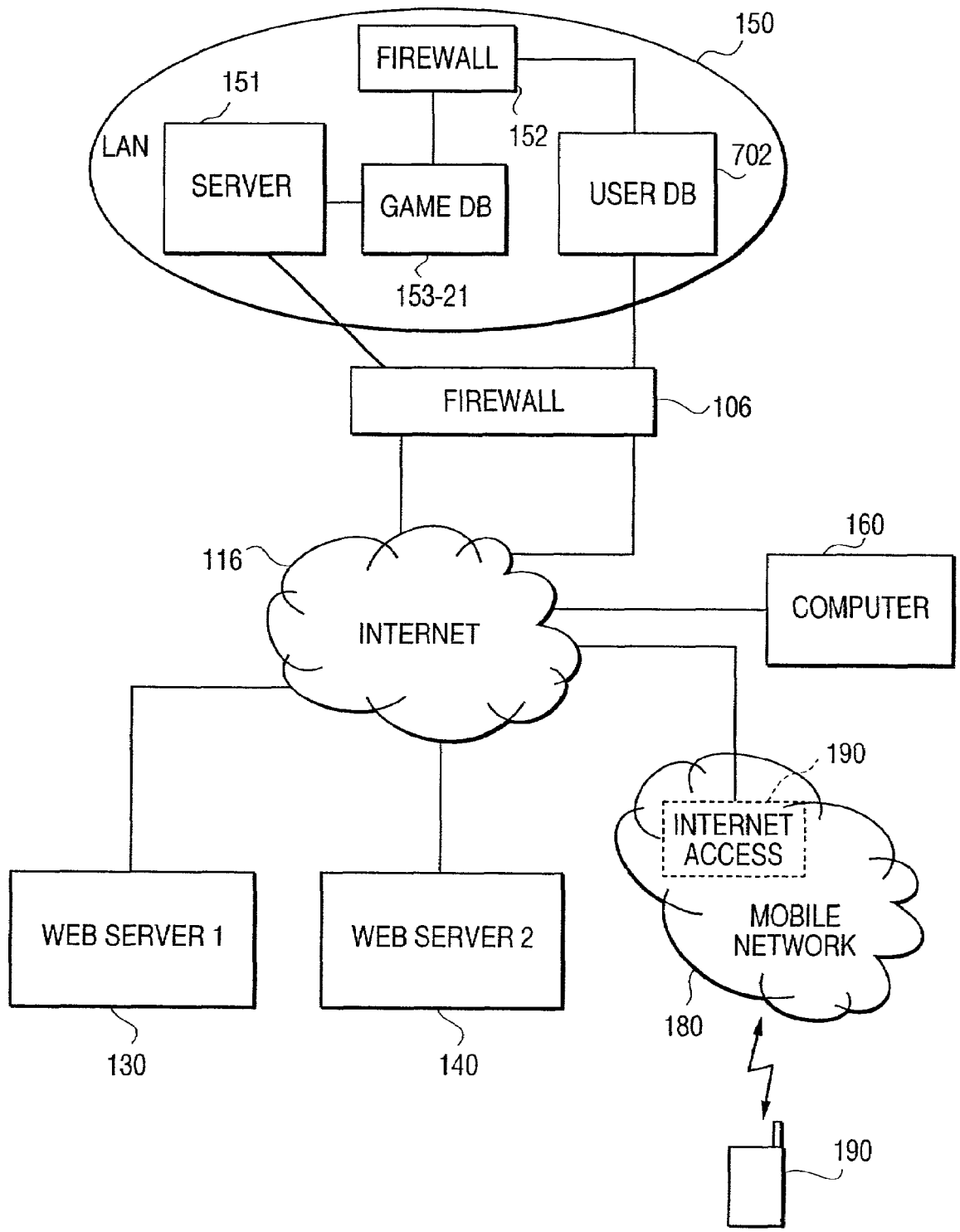
FIG. 7B depicts a block diagram of a second sample embodiment of the betting provider architecture.

FIG. 7B depicts a block diagram of the betting provider architecture in the second sample embodiment. One important difference between the first and second sample embodiments of the betting provider is the manner in which the architecture obtains betting information. In the second sample embodiment, the betting provider actively obtains the betting information, such as results from sport events, betting rates, validity date of bets, teams, status or any betting related activity, from the Internet. The betting provider acquires the betting information from a reliable or authentic web site or authentic databases through the Internet. It is not required that the betting information is specially entered into the system by for example, betting controller 704.

As in the first sample embodiment, betting provider 150 is protected from network snooping by a security device such as firewall 106. Betting provider 150 preferably comprises a plurality of discrete elements, which may be organized into a Local Area Network (LAN). A server 151 performs most of the tasks associated with the betting services. In addition to its other functions described below, software running on server 151 authenticates users (bettors) and tracks their bets in various competitions. A user information database 702 stores user names and associated passwords, user account information, user preferences, and other user specific information. It can be accessed by authorized users through firewall 106 independently of server 151. A firewall 152 prevents unauthorized back-door entry to server 151 and Game Database 153-21 through user information database 702.

Figure 7E:
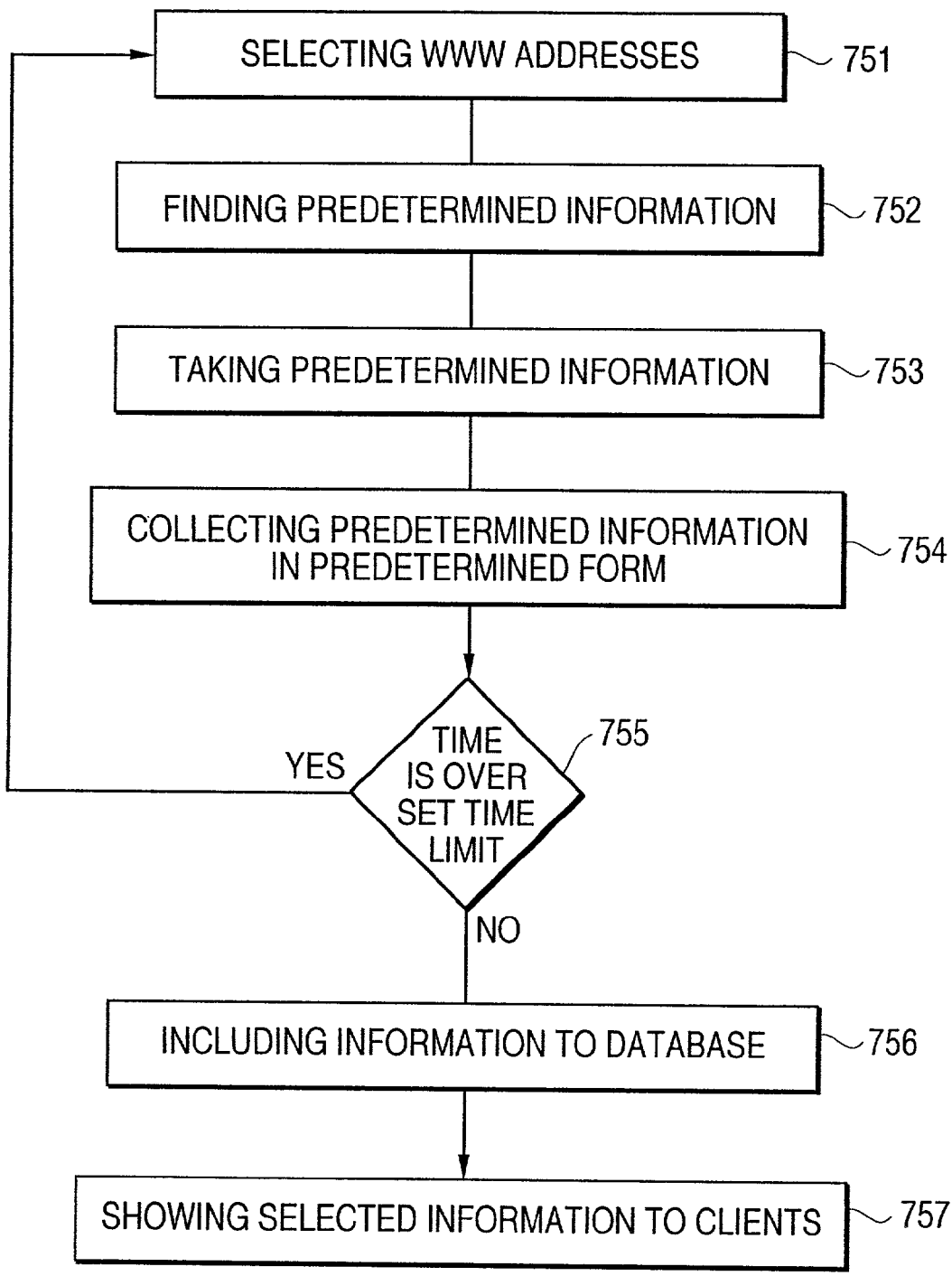
FIG. 7E is a flowchart illustrating a process performed by the betting provider architecture in the second sample embodiment.

Unlike betting provider server 108 in the first embodiment, betting provider 150 in the second sample embodiment does not use betting content (such as questions to the bettor) and the odds of the particular bets created by a betting controller 704 located on the betting provider side of firewall 106. Instead, it carries out the process shown in FIG. 7E. First, server 151 selects the address(es) of web site(s) containing desired information (Step 751) and finds the predetermined information on the web site(s) (Step 752). It takes data, primarily betting content and odds, from page(s) on separate web servers 130 and 140 via Internet 116 and firewall 106 (Step 753). The data content on web servers 130 and 140 can be maintained and organized in any manner. In particular, web servers 130 and 140 may be managed either with or without particular regard to the accessing of data thereon by betting provider 150. The data content can be separated between web servers 130 and 140 in any manner. For example, betting information and odds, such as for various sport matches, may be on one server while the results of the matches may be on another server. Alternatively, the system can process the betting information on a server obtained in order to create betting rates based on calculations and statistical models of the event and its probabilities. Exemplary content for web servers 130 and 140 is shown in FIGS. 7C and 7D, respectively. Although two web servers are shown in the sample embodiment shown in FIG. 7B, the betting provider may collect betting information from any number and variety of systems connected to Internet 116.

Figure 7F:
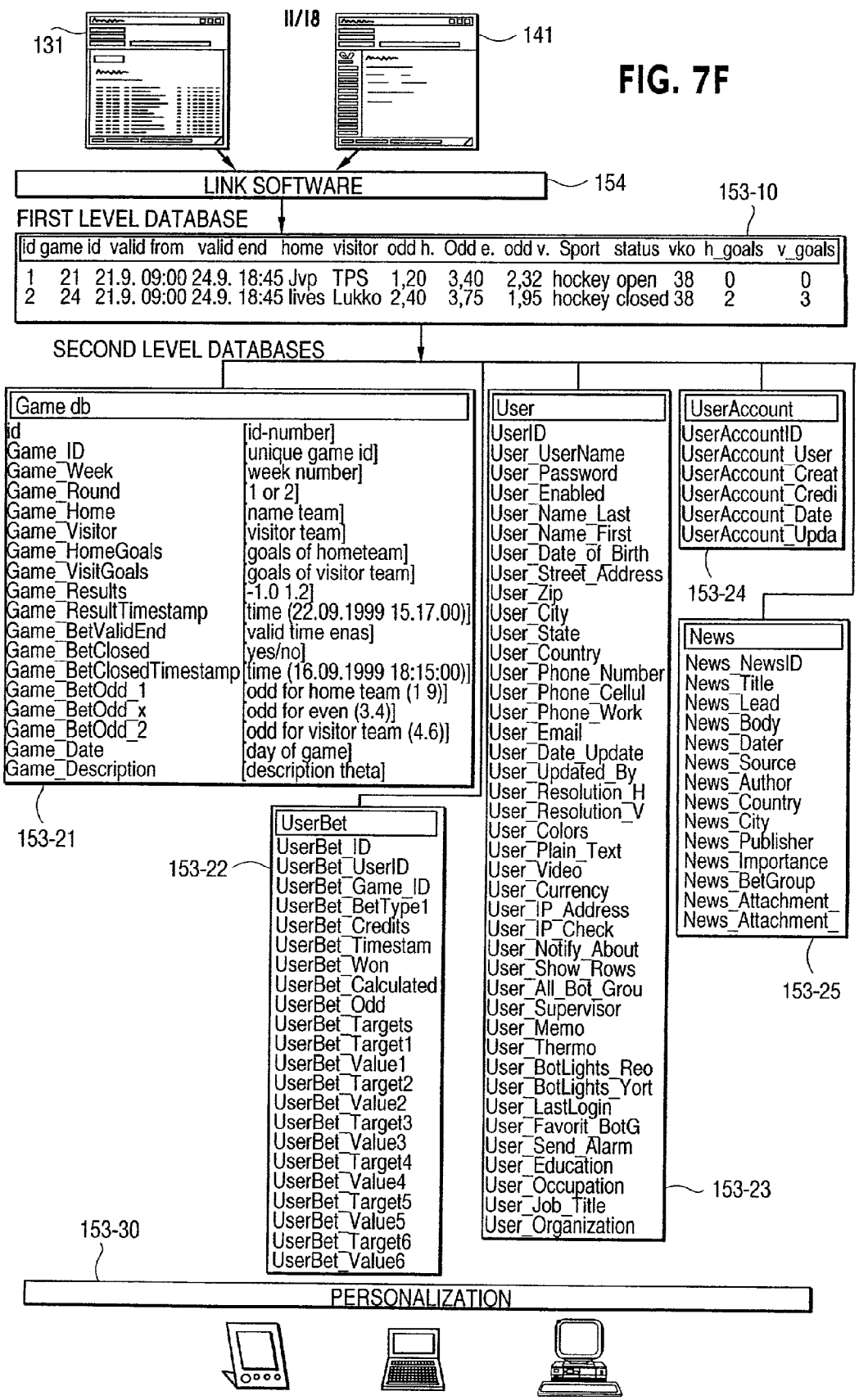
FIGS. 7F and 7G shows the databases created and maintained by the betting provider architecture in the second sample embodiment.

Server 151 runs software which collects the betting information from web servers 130 and 140 and stores it in a predetermined format (Step 754). The system can actively and independently update and bring into effect (put in force) the online information. Exemplary elements of the process are illustrated in FIG. 7F. Link software 154 preferably works with a timetable, which instructs it when to get information and make automatic updates to the first level database 153-10 (Step 755).

Server 151 is responsible for controlling the betting events, i.e., opening and closing of betting, etc., of all of the authorized users. It receives and accepts bets that have been requested by the users. Server 151 retrieves the results of sports matches by accessing web server 140 under the control of the link software 154 and records the results in a database (not shown). Users can interactively retrieve the results through server 151. Once the results are retrieved and stored, software on server 151 calculates wins and makes payments to the bettors. Electronic accounts stored in the UI database 702 are used for tracking betting wins and losses.

Figure 7G:
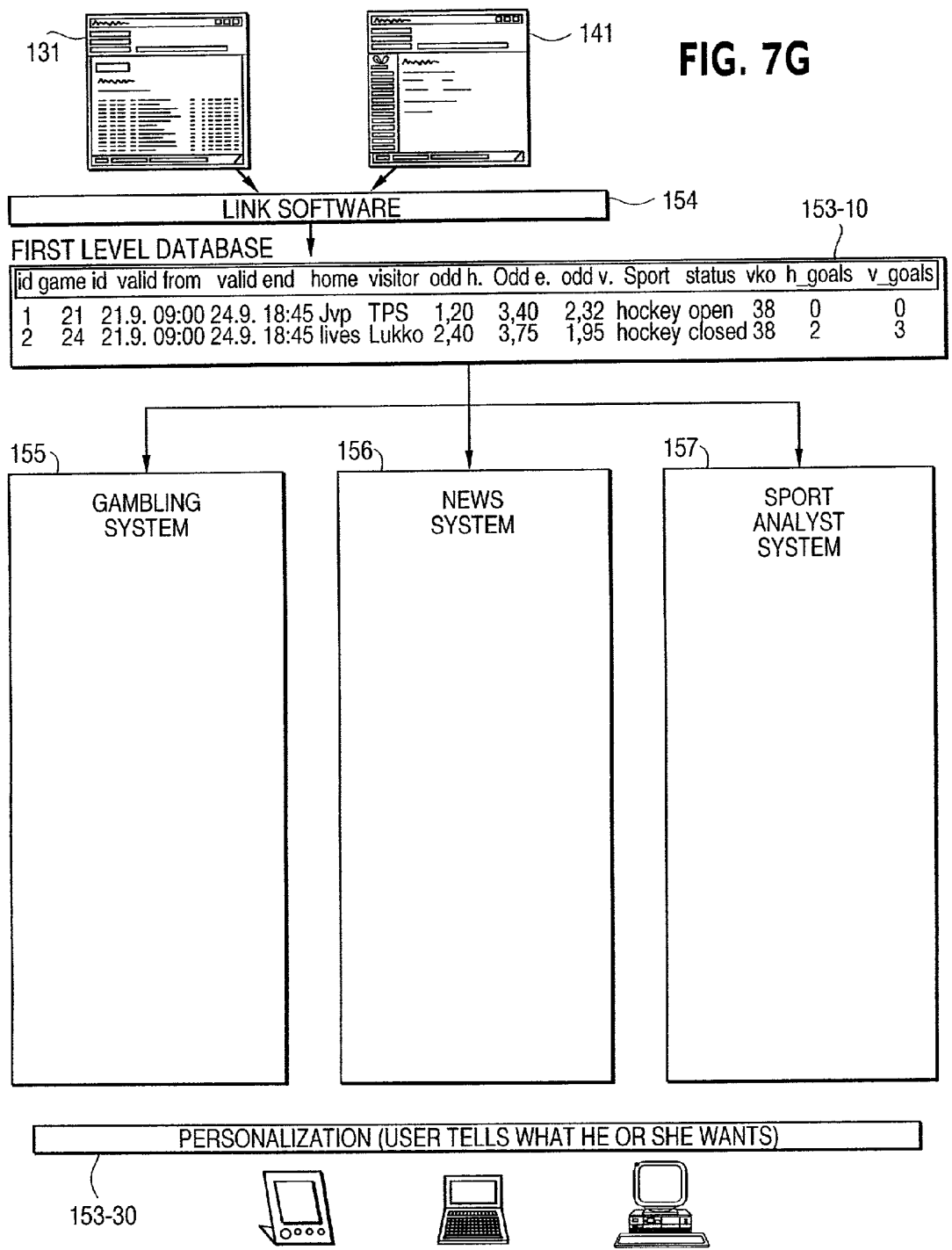

In providing the betting services, the link software 154 takes the data content from the web page(s) 131 and 141 of web servers 130 and 140 and includes it in a first level database 153-10 (Step 756). The data content in first level database 153-10 is used to generate a plurality of different second level databases 153-20, such as Game Database 153-21, user databases 153-22 to 153-24, and News database 153-25 shown in FIG. 7F. (It should be understood that, although the databases are referred to herein as either "first level" or "second level" databases, it may be such (strictly speaking) that there is only one level of data. The terms "first level" and "second lever" are meant to refer to the functionalities that are done in the server.) Advertisements and sports analysis databases can also be generated. These and other databases can be used in a variety of systems, such as Gaming System 155, News System 156, and Sports Analyst System 157 shown in FIG. 7G.

A particular aspect of the invention is the generation of a second-level personalization database 153-30 for each authorized user. Information from among the various databases is selected and then shown to the user according to personalization database 153-30 (Step 757).

Each user may utilize any kind of Internet capable terminal device such as a computer 160 with a wired connection (which may be a desktop computer, laptop computer, handheld computer, or Palm™ device) or a mobile device 190 having a wireless connection via Internet access 170 in mobile network 180. The wireless connection can be made via Bluetooth, a Wireless Local Area Network (WLAN) or GSM/GPRS common access methods.

Preferably, betting provider 150 either executes software which automatically recognizes the type of terminal used by a user and/or permits the user to identify, as part of the registration process, the type of terminal they will normally use, what kind of connection and connection speed is used and what kind of information is desired (e.g., sports). Because the screens of many mobile devices are small, irrelevant information can be removed so that each user of a mobile device gets only their desired information. For example, the user can fill out a questionnaire beforehand and state that they only wish to receive information and make bets with respect to, for example, hockey games.

Alternatively, betting provider 150 may also create data stored in the personalization database by monitoring the user's navigation through the browser and the betting selections. As the user makes a request, such as by clicking on an object, the server 151 registers the subject of the request and responds with an appropriate page based on the request. The system can create the profile by analyzing and processing this historical information. Using the resulting history-based profile, the betting provider 150 displays the bets which best match the user's interests. Also, other already existing personalizing information can be used as an extra source to determine the user profiles.

When a user wants to make a bet and user has already made bets before, the system may already be aware of the type of bets the user likes to do or is likely to do. These bets can be, for example, on a particular subject, such as football, hockey, etc. and what specific team or teams of interest to the user, or if the user is more likely to bet on the home team than the visitor team.

The system preferably creates the profile in the personalization database for every user it identifies and actively updates the personalization information according to the user's actions. The identification can be according to user identity and a corresponding password. Alternatively, if a user uses a device that requires a PIN (Personal Identification Number) and has some kind of SIM (Subscriber Identification Module) or equivalent, the system can easily identify the person using the device. The password to the betting system may be unnecessary because the system can identify the user according to the predetermined identification information (i.e., PIN & SIM information).

Video and audio streaming of an on-going competition on which viewers may bet is accomplished, in the preferred embodiments, through use of a live video/audio streaming server (VAS) 118. The VAS is connected to a network such as an extranet, intranet, or the Internet 116. A live broadcast 120 of a competition is received through an RF receiver at the server. The audio and video components of the signal are separated and digitized. The digitized audio is then compressed using one of several digital compression schemes, for example, H.728, H.729, or GSM. Likewise the digitized video is compressed using a scheme such as MPEG, MVC, H.261, etc. The digitally compressed audio and video are packaged for network transfer e.g., TCP/IP, UDP. The packets are then broadcast to the network 116 controlled by a streaming/multicasting controller.

The mobile betting client 102 has PIP functionality. This functionality allows the viewer to simultaneously view two audio/video broadcasts in the display of the mobile betting client. The two broadcasts can be, for example, the live-feed of a competition in one picture and interactive betting possibilities in another.

Figure 3:
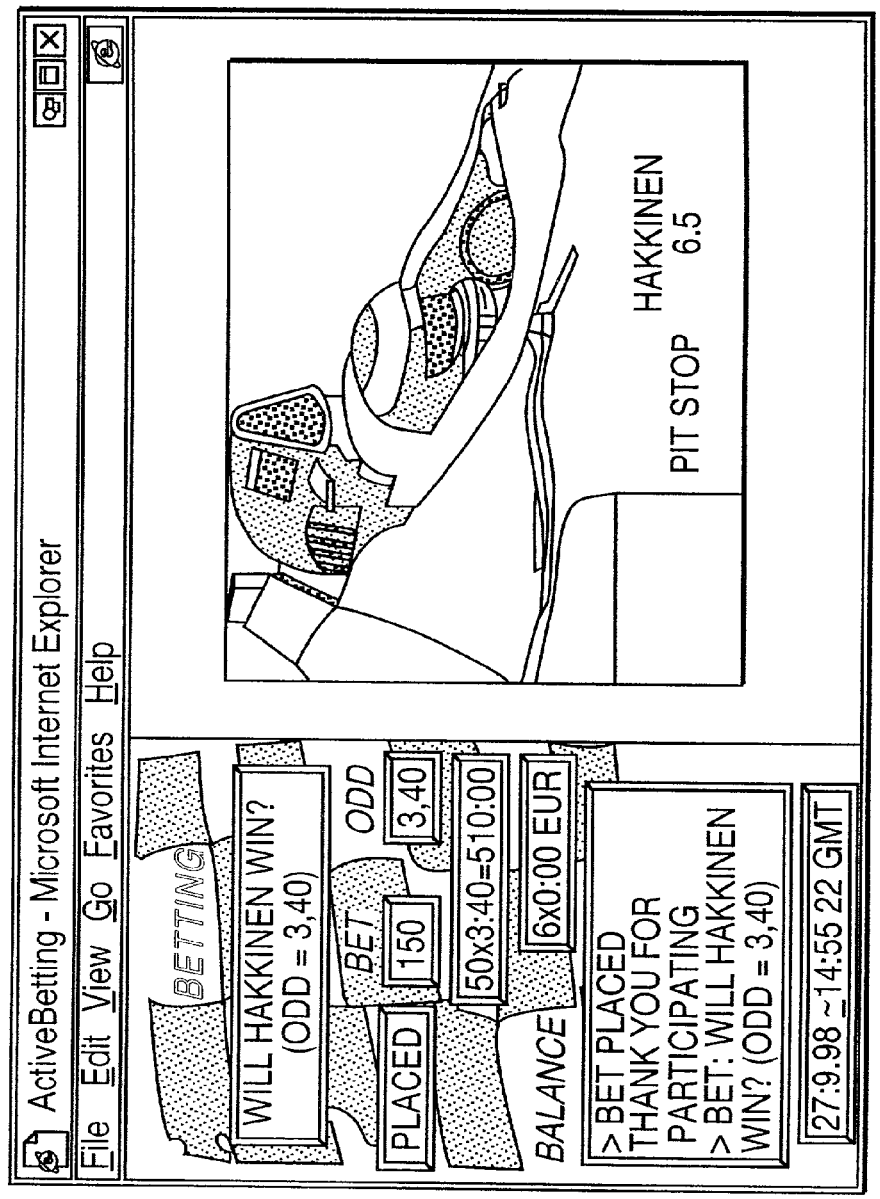
FIG. 3 depicts an integrated display with a live video feed and interactive content.
Figure 5:
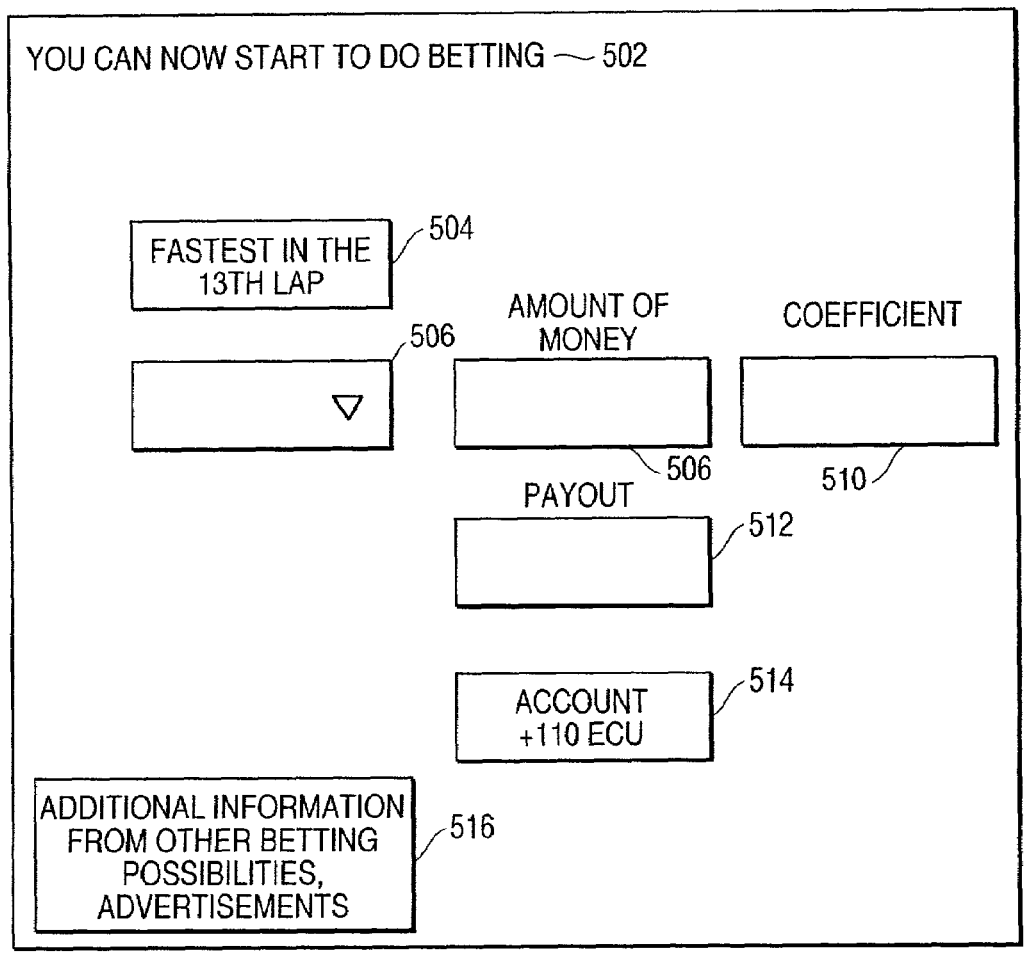
FIG. 5 is a diagram depicting a possible interactive display.

FIG. 5 is a diagram depicting a possible interactive display. Directions at the top of the display 502 inform the viewer of the status or title of the interactive activity, in this case, betting. For an application such as betting, a dialog-type box 504 is used to inform the viewer of the current question on which bets can be placed. In the context of an auto race, a question such as "Who will turn the fastest 13th lap" may be presented. A pull-down menu or radio button dialog box 506 may be presented depending on the type of question. In the above example, all of the drivers remaining in the race may be presented in a pull-down menu. Dialog boxes specific to wagering: stakes 508; odds 510; and payout 512, may also be presented. A statement of account 514 with a betting services provider may also be presented. The account is dynamic throughout the competition, registering winnings and debits as each occurs. A response dialog 516 informing the user of bets being received and the current allowable wagers may also be provided. Such a response window is also dynamically updated as available bets are made or changed. In addition to the displays listed above, dialog boxes presenting last minute betting advice or information can also be displayed. Such advice can include, for example, up to the minute status of race participants not currently being shown on the broadcast or the injury status of key players at an event. FIG. 3 depicts an integrated display with a live video feed and interactive content.

Figure 10:
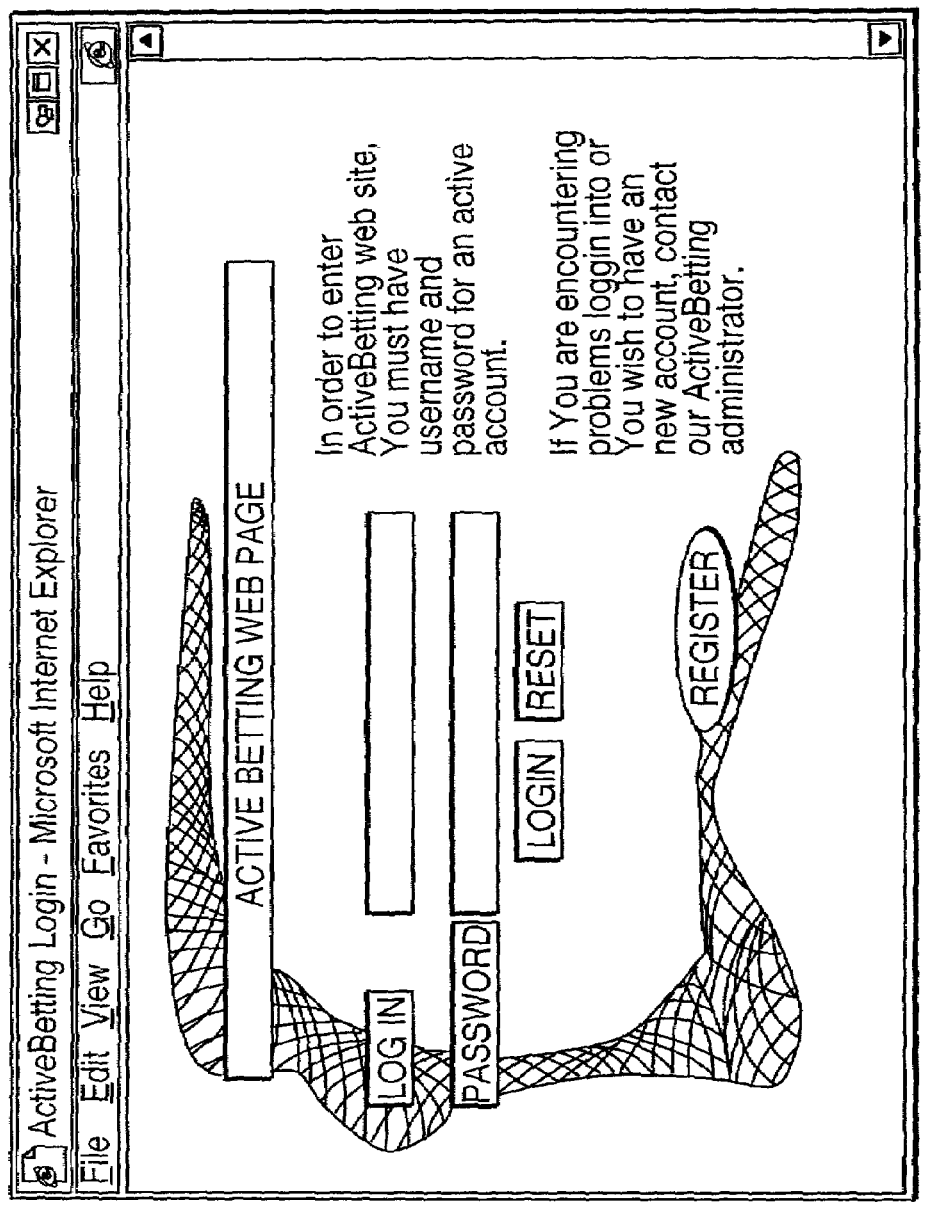
FIG. 10 depicts a betting login page which includes Login and Password fields for logging on to the interactive service.

FIG. 10 depicts a betting login page which includes Login and Password fields for logging on to the interactive service. The connection can be established over the Internet using a Virtual Private Network (VPN) tunnel and Secure Sockets Layer (SSL) connection. Once a secure connection is established, an authentication process occurs in which the users enters his user name and password in separate fields. If the incorrect user name and password are entered, the login screen is again displayed. No assumption is made that the mobile betting client has a keyboard or a mouse. However, the user can edit text with a delete key and navigate with arrow keys or other cursor control in both the horizontal and vertical planes.

In order to participate in the service, the user will need to register with the betting provider server 108. New users will need to register. Registration information includes information about the device the user is connecting with, the bandwidth of the connection, and the style sheet (or skin) the user prefers. New user generally are kept from participating in the service until an active betting supervisor or administrator enables the user logon.

Figure 11:
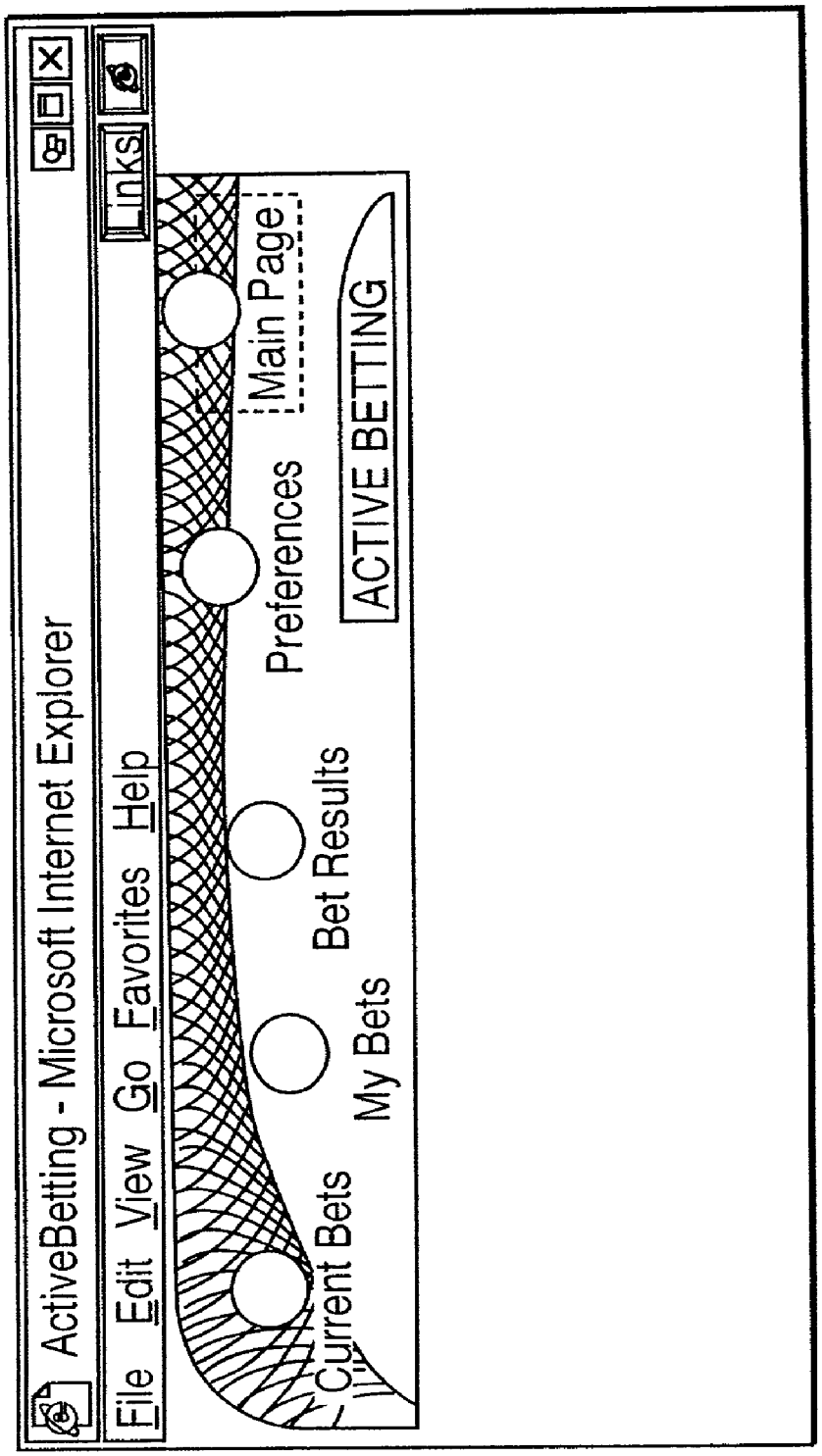
FIG. 11 depicts a main betting page supplied by the betting server to the user at logon.

Logging on allows users of the service to make bets and watch both live and on-demand streaming broadcasts. FIG. 11 depicts a main betting page supplied by the betting server 110 to the user at logon. Information such as the current time, last use, and account balance information is displayed. Information such as the number of other users currently participating can also be displayed. Users can navigate from the main betting page to other pages by navigating with the arrow or cursor control keys.

After the log-in process, the only chance to navigate is downward to reach "lower" folderleaves. Thereafter, the user can navigate up or down in the levels to choose the service. In a preferred embodiment of the invention, there are four main services which can be on different pages or vertically positioned in the display screen. The main page is for betting actions and watching video transmissions. There may also be a news service providing various short messages concerning the games. A settings page allows a user to change their personal settings.

Figures 12, 13:
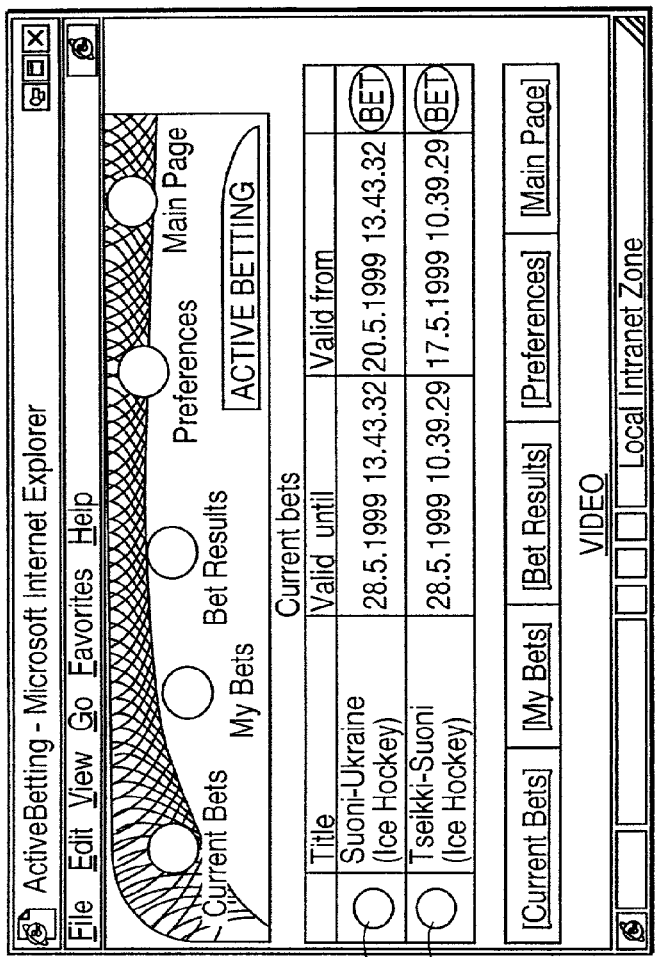
FIG. 12 depicts a window showing the status of currently available betting opportunities.
FIG. 13 depicts a table representing the user selection of colors and when the different colors can be shown.

FIG. 12 depicts a page showing the status of currently available betting opportunities. The betting window, that is the times during which placed bets will be valid is also displayed. The page functionality is shown as visual or graphical illustrations. The page can contain and present betting information in many different forms, for example, warning lights. The page depicted in FIG. 12 has blinking lights in the form of traffic lights 1202. The traffic lights are designed to provide advanced notification to the user of situations in the betting window. For example, one situation would be the amount of time left in the betting window. For another example, a change in the betting information which could affect the choice of bets placed. In the presently preferred embodiment, the traffic lights use color to indicate the importance or immediacy of particular information: e.g., red, orange and green.

FIG. 13 depicts a table representing the user selection of colors and when the different colors can be shown. The color preference choice can be made at registration. In the presently preferred embodiment, the orange traffic light is configured to appear a day or two prior to the close of the betting window. The red light is configured to appear when only a few minutes of betting are available. In the presently preferred embodiment, the user cannot change the appearance of the utmost important color. The utmost important color is set by the rules of the betting administrator, usually red.

Figure 6:
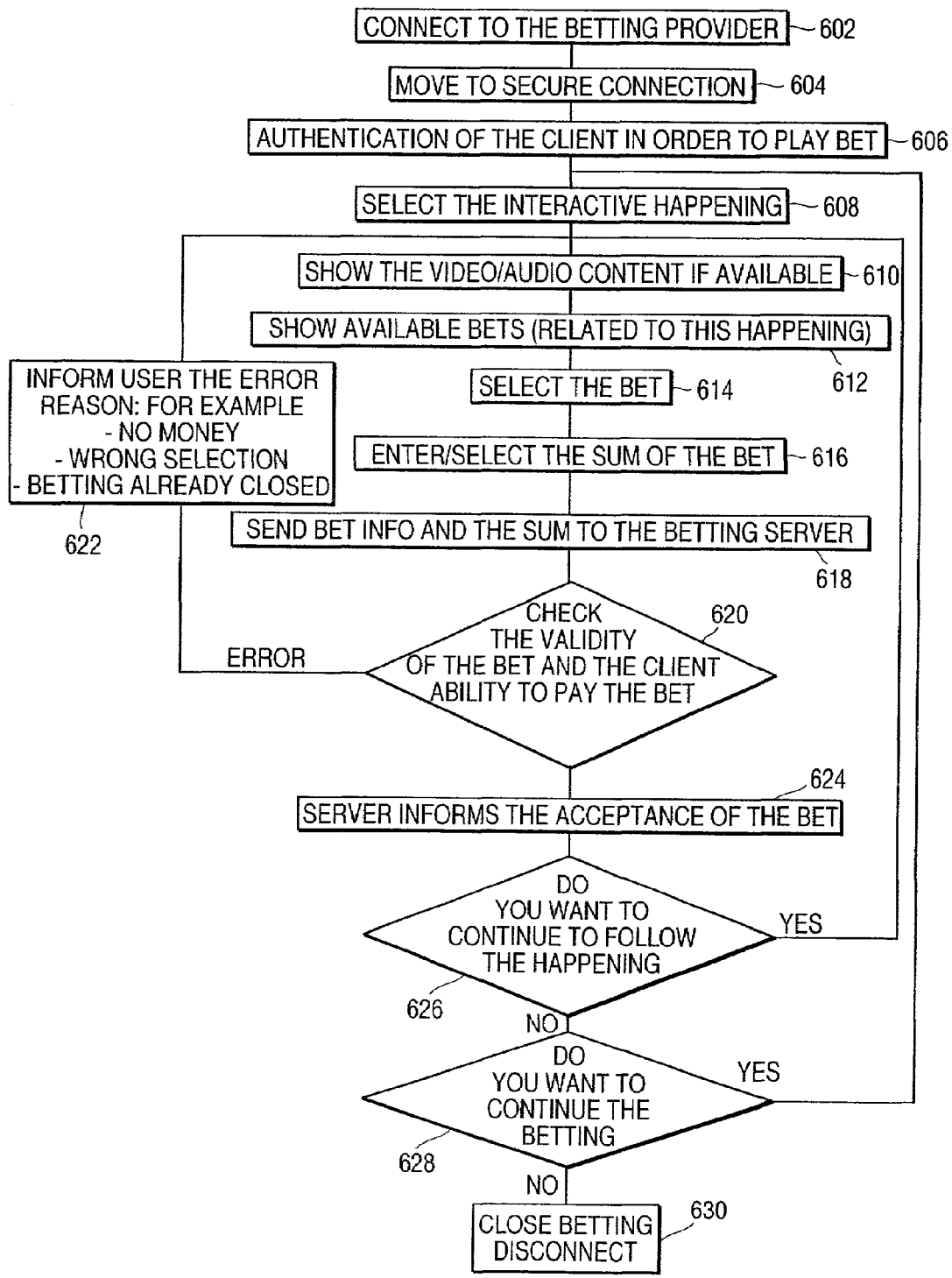
FIG. 6 depict a flowchart of the interactive betting process.

In addition to traffic signals, the window can have flashing or blinking colors to impart information to the user. Again, the flashing or blinking of text can be made at registration. The user interface database 702 in the betting provider server 108 contains the skin preference information i.e., titles of the pages, background information selections, font selection; color selection etc. FIG. 14 depicts skins which can be configured according to user preference. In the presently preferred embodiment, the users personal information page allows changes in skin preferences. For example, if player is a NHL Dallas Stars fanatic, the user can change color of pages, icons, and push buttons, to green and gold tones FIG. 6 depicts a flowchart of the interactive betting process. First, a mobile betting client wishing to interactively bet connects to the betting provider (Step 602). Once connected, a secure network connection, using, for example, encryption or secure sockets, is established (Step 604). Once a secure connection is established, an authentication process occurs, comparing user name and password entered by the client to entries in a database of user information (Step 606). Once authenticated, the client can select the type of competition to bet on, for example, auto racing, hockey, or football. (Step 608). If live video and audio is available, the competition is displayed (Step 610). The interactive betting opportunities currently available for the chosen competition are then displayed to the client (Step 612). The betting opportunities are dynamic and will be continuously updated. The client informs the betting provider of its desire to bet (Step 614) and the stakes (Step 616). The stakes can be variable amounts or limited to selections presented in a choice menu. The betting selection and the stakes are sent to the betting provider across the secure connection (Step 618). The betting provider verifies the entries made by the client (Step 620). Further checks, including client payment history and credit reports can be included in this verification step (Step 620). If any of the entries is invalid, a valid entry is requested (Step 622). Entries can be invalid for several reasons, for example, incorrect selection, closing of the requested betting selection prior to the bet being received, or the client's inability to cover the stakes.

If the entries are valid, the betting provider informs the client of that the particular wager has been accepted (Step 624). Different bets open and close during the course of the competition. Once the bet has been made and accepted, the client may continue to view the competition, personally monitoring the outcome of its wager and making other bets on the same competition (Step 626). The client may also choose a different competition to view and possibly bet on (Step 628). If the client does not wish to view or bet on any other competitions, the connection between the client and the betting provider is closed (Step 630).

At some point after the close of a particular wager, the participants are informed of the result and appropriate adjustments to betting accounts are made. If the client is still connected to the betting provider when the results are known, the client can be informed of the results. Otherwise, the client can be informed of the status of any outstanding wagers the next time a connection to the betting provider is established.

Figure 8:
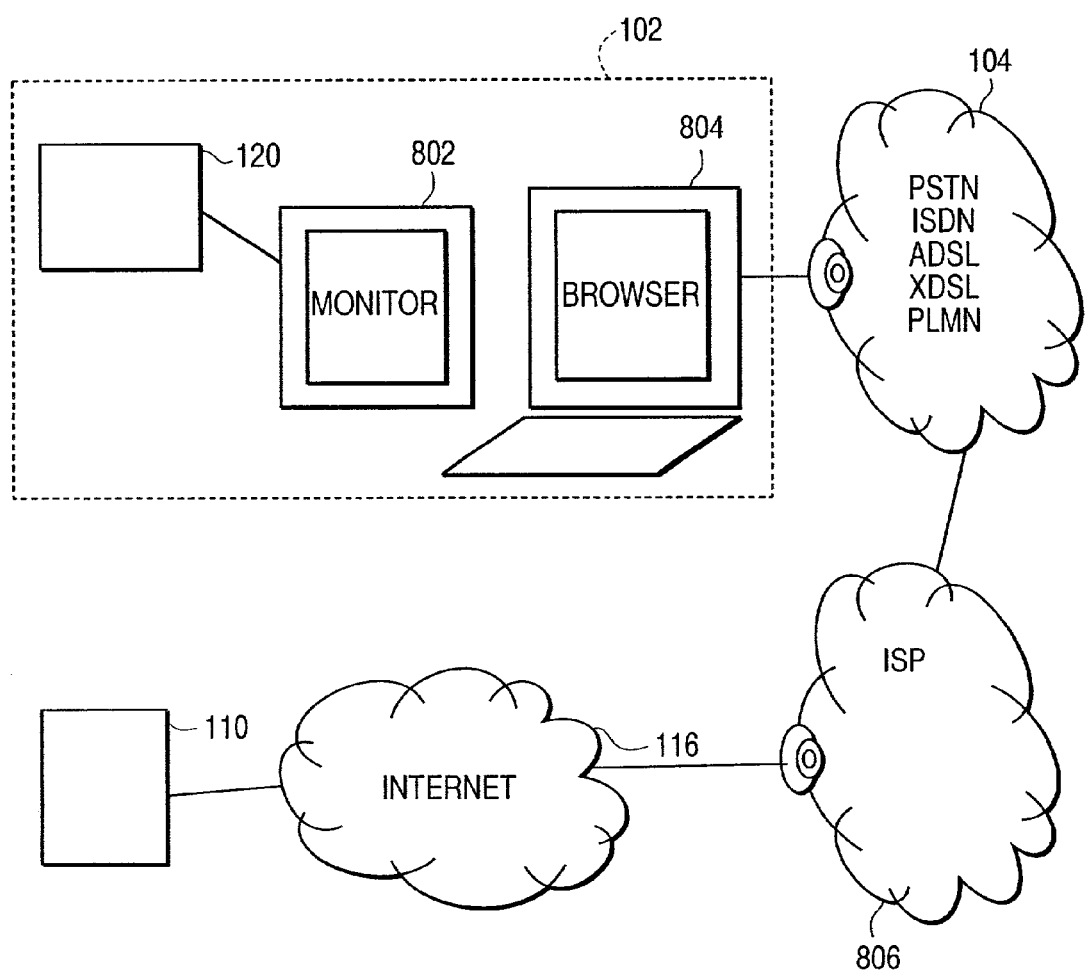
FIG. 8 depicts a block diagram of a direct reception scenario.

In an alternative embodiment, a live broadcast 120 of a competition can be received directly by the mobile betting client 102. FIG. 8 depicts a block diagram of a direct reception scenario. The mobile betting client 102 can, of course, be at the viewer's home or at another viewing location. The broadcast 120 is displayed in a monitor 802. Additionally, an Internet browser can be connected to the monitor 802 or, alternatively, to a separate display 804 in order to interface with the betting server 110 through a switching network 104 and an Internet service provider (ISP) 806. The PIP property of the monitor can be used if the browser and the broadcast 120 are shown in the same monitor.

Figure 9:
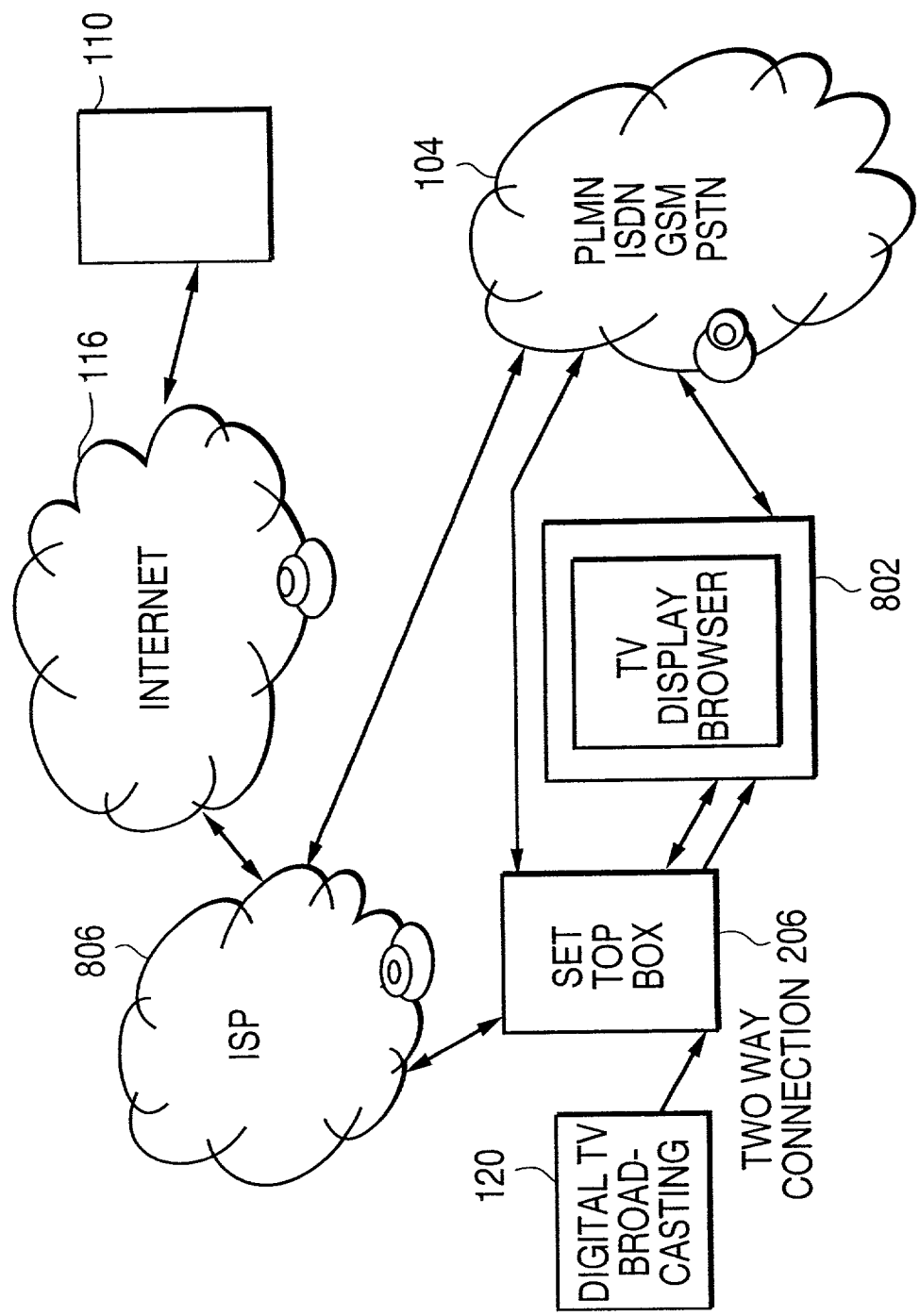
FIG. 9 depicts a block diagram of an integrated reception scenario.

In another alternative embodiment, a DVB signal with the live broadcast 120 and betting information from the betting server 110 can be integrated into a digital broadcast. FIG. 9 depicts a block diagram of an integrated reception scenario. A mobile betting client monitor 802 can use PIP functionality to separate the two displays. The viewer receives information and sends responses to the betting provider through an Internet connection 116. Such a connection can also be made through a Set Top Box 206 which enables two way communications via cable (possibly using the DVB-C standard) or through a PSTN, ISDN, or other connection 104 to an ISP 806.

As will be recognized by those skilled in the art, the innovative concepts described in the present application can be modified and varied over a tremendous range of applications, and accordingly the scope of patented subject matter is not limited by any of the specific exemplary teachings given.

For example, the indicators for changes in betting situation in the presently preferred embodiments are traffic signals. However, other indicators can be used to highlight the importance or display information to the user. For example, the interface depicting the time left in a betting window can be textual, graphic, animation, audio, or video media.

For another example, the mobile betting client monitor has been described. The monitor can be any type of display. For example, a television or computer monitor, including flat panel type displays.

The mobile client itself can be any type of unit capable of receiving and displaying signals. For instance, the mobile client can be an HDTV with a PIP module and web browser capability. On the opposite end of the mobility and size spectrum, the mobile betting client can be a hand-held cellular phone with a small display.

Depending on the capabilities of the mobile client, intermediate protocols and network connections may not be required to achieve connection to the streaming data and interactive servers.

The databases containing betting and user information can be designed with any number of differing architectures, for example, relational, hierarchical, or object oriented.

While interactive sports betting has been described, other interactive events can be integrated and broadcast. Such events can include, for example, video games, shopping, and educational activities.

The preferred context of the disclosed embodiments contemplates digital delivery of broadcasts. However, depending on the hardware setup, analog signals may be used for delivery of the event broadcast and the interactive display.

The preferred context of the disclosed embodiments contemplates delivery of events and betting information. However, a software stand-alone version, for example, an interactive CD-ROM video game, can be created having the functionality of the network and servers and terminals. Random generation can simulate live events. The video or interactive content of the game can remain the same with the random generation providing the variation needed for multiple plays.

In another context, software, for example, an interactive CD-ROM video game, can be created which depends on interactivity with the network and servers of a betting provider to generate the random events and betting opportunities in a simulated game. Such a game can be played interactively with other participants at remote locations all receiving the same randomly generated events and betting opportunities.

What is claimed is:

1. A method comprising:
   retrieving real-time interactive content from a plurality of sources into a server;
   recognizing first transmission and reception capabilities of a first client device with said server;
   recognizing second transmission and reception capabilities of a second client device with said server, said second transmission and reception capabilities of said second client device being different than said first transmission and reception capabilities of said first client device;
   configuring said real-time interactive content according to said first and second transmission and reception capabilities to ensure said first and second client devices each have an adequate time window during which a submitted response to the real-time interactive content will be considered valid;
   generating information pertinent to the real-time interactive content; and
   substantially simultaneously transferring said configured real-time interactive content and said pertinent information to said first and second client devices.

2. A method as recited in claim 1, wherein said interactive content is retrieved and updated automatically in accordance with a timetable.

3. A method as recited in claim 1, further comprising organizing the retrieved interactive content into a first level database.

4. A method as recited in claim 3, further comprising storing preference of a user associated with said first client device in said server, wherein a set of second level databases are generated according to the preferences of said user.

5. A method as recited in claim 4, wherein the method provides interactive services to a plurality of users, the first level database is organized and shared among said plurality of users, and a plurality of individual sets of second level databases are generated, said plurality of individual sets of second level databases corresponding respectively to said plurality of users.

6. The method according to claim 1, wherein said configured real-time interactive content comprises betting information.

7. The method according to claim 6, wherein said pertinent information comprises current information regarding prospective wagers.

8. The method according to claim 6, wherein said configured real-time interactive content comprises betting information related to the preferences of said first and second client devices.

9. The method according to claim 8, wherein the configured real-time interactive content comprises betting information related to a sports team indicated as being of interest to users of said first and second client devices.

10. The method according to claim 6, wherein, for the step of configuring, said time window comprises a betting window during which a placed bet will be considered valid.

11. The method according to claim 1, wherein, for the steps of recognizing and configuring, said first and second transmission and reception capabilities with the server each include a type of terminal for the respective client device, a kind of connection with the server, and a connection speed with the server.

12. A computing apparatus having software stored thereon that when executed instructs the computing apparatus to perform actions comprising:
   retrieving real-time interactive content from a plurality of sources into said computing apparatus;
   recognizing first transmission and reception capabilities of a first client device with said computing apparatus;
   recognizing second transmission and reception capabilities of a second client device with said computing apparatus, said second transmission and reception capabilities of said second client device being different than said first transmission and reception capabilities of said first client device;
   configuring said real-time interactive content according to said first and second transmission and reception capabilities to ensure said first and second client devices each have an adequate time window during which a submitted response to the real-time interactive content will be considered valid;
   generating information pertinent to the real-time interactive content; and
   substantially simultaneously transferring said configured real-time interactive content and said pertinent information to said first and second client devices.

13. The computing apparatus as recited in claim 12, wherein said interactive content is retrieved and updated automatically in accordance with a timetable.

14. The computing apparatus as recited in claim 12, wherein said real-time interactive content is retrieved and updated automatically in accordance with a timetable.

15. The computing apparatus as recited in claim 1, further comprising organizing the retrieved interactive content into a first level database.

16. The computing apparatus as recited in claim 15, wherein the computing apparatus provides interactive services to a plurality of users, the first level database is organized and shared among said plurality of users, and a plurality of individual sets of second level databases are generated, said plurality of individual sets of second level databases corresponding respectively to said plurality of users.

17. The computing apparatus according to claim 12, wherein said configured real-time interactive content comprises betting information.

18. The computing apparatus according to claim 17, wherein said pertinent information comprises current information regarding prospective wagers.

19. The computing apparatus according to claim 17, wherein said configured real-time interactive content comprises betting information related to preferences of said first and second client devices.

20. The computing apparatus according to claim 19, wherein the configured real-time interactive content comprises betting information related to a sports team indicated as being of interest to users of said first and second client devices.

21. The computing apparatus according to claim 17, wherein, for the action of configuring, said time window comprises a betting window during which a placed bet will be considered valid.

22. The computing apparatus according to claim 12, wherein, for the actions of recognizing and configuring, said first and second transmission and reception capabilities with the computing apparatus each include a type of terminal for the respective client device, a kind of connection with the computing apparatus, and a connection speed with the apparatus, and said first transmission and reception capabilities.

23. An apparatus comprising:
a communications interface; and
a processor configured to:
- retrieve real-time interactive content from a plurality of sources into said apparatus;
- recognize first transmission and reception capabilities of a first client device with said apparatus;
- recognize second transmission and reception capabilities of a second client device with said apparatus, said second transmission and reception capabilities of said second client device being different than said first transmission and reception capabilities of said first client device;
- configure said real-time interactive content according to said first and second transmission and reception capabilities to ensure said first and second client devices each have an adequate time window during which a submitted response to the real-time interactive content will be considered valid;
- generate information pertinent to the real-time interactive content; and
- substantially simultaneously transfer said configured real-time interactive content and said pertinent information to said first and second client devices.

24. The apparatus according to claim 23, wherein, for the actions of recognizing and configuring, said first and second transmission and reception capabilities with the apparatus each include a type of terminal for the respective client device, a kind of connection with the apparatus, and a connection speed with the apparatus.

25. The apparatus according to claim 23, wherein said apparatus provides a betting service and said adequate time window to respond to the real-time interactive content comprises a betting window during which a placed bet will be considered valid.

* * * * *

UNITED STATES PATENT AND TRADEMARK OFFICE
CERTIFICATE OF CORRECTION

PATENT NO. : 7,451,401 B2  
APPLICATION NO. : 09/981688  
DATED : November 11, 2008  
INVENTOR(S) : Tanskanen et al.

Page 1 of 1

It is certified that error appears in the above-identified patent and that said Letters Patent is hereby corrected as shown below:

Column 14, Claim 15, Line 31:
Please replace "recited in claim 1" with --recited in claim 14--.

Signed and Sealed this

Fourteenth Day of July, 2009

JOHN DOLL  
*Acting Director of the United States Patent and Trademark Office*